(12) United States Patent
Huber et al.

(10) Patent No.: US 6,871,150 B2
(45) Date of Patent: Mar. 22, 2005

(54) EXPANDABLE INTELLIGENT ELECTRONIC DEVICE

(75) Inventors: Benedikt T. Huber, Victoria (CA); Kurtulus H. Ozcetin, Sidney (CA); Hal E. Etheridge, Victoria (CA); Geoffrey T. Hyatt, Victoria (CA); Simon H. Lightbody, Victoria (CA); Piotr B. Przydatek, Victoria (CA)

(73) Assignee: Power Measurement Ltd., Saanichton (CA)

( * ) Notice: Subject to any disclaimer, the term of this patent is extended or adjusted under 35 U.S.C. 154(b) by 475 days.

(21) Appl. No.: 09/931,145

(22) Filed: Aug. 15, 2001

(65) Prior Publication Data

US 2003/0065459 A1 Apr. 3, 2003

Related U.S. Application Data

(63) Continuation-in-part of application No. 09/791,421, filed on Feb. 23, 2001.

(51) Int. Cl.[7] ............................................. G01R 21/00
(52) U.S. Cl. ........................................ 702/62; 700/291
(58) Field of Search ............................... 702/57, 60–62, 702/64–67, 122, 187–188; 700/22, 86–88, 286, 291–298; 709/204–207, 246; 340/514

(56) References Cited

U.S. PATENT DOCUMENTS

| 4,225,839 | A | 9/1980 | Martincic |
| 4,900,275 | A | 2/1990 | Fasano |
| 4,957,876 | A | 9/1990 | Shibata et al. |
| 5,001,420 | A | 3/1991 | Germer et al. ............... 324/142 |
| 5,056,214 | A | 10/1991 | Holt |

(List continued on next page.)

FOREIGN PATENT DOCUMENTS

| WO | WO 01/01079 A1 | 1/2001 |
| WO | WO 01/01154 A1 | 1/2001 |
| WO | WO 01/01155 A1 | 1/2001 |
| WO | WO 01/01156 A1 | 1/2001 |
| WO | WO 01/01157 A1 | 1/2001 |
| WO | WO 01/01159 A1 | 1/2001 |
| WO | WO 01/01160 A1 | 1/2001 |
| WO | WO 01/55733 A1 | 8/2001 |

OTHER PUBLICATIONS

Sezi et al., "New intelligent electronic devices change the structure of power distribution systems", Oct. 1999, Industry Applications Conference, 1999. Thirty–Fourth IAS Meeting. Conference Record of the 1999 IEEE, vol. 2, pp. 944–952.*

(List continued on next page.)

Primary Examiner—Marc S. Hoff
Assistant Examiner—Mary Catherine Baran
(74) Attorney, Agent, or Firm—Brinks Hofer Gilson & Lione

(57) ABSTRACT

An intelligent electronic device (IED) includes a base module having a power monitoring circuit operative to monitor a parameter of a portion of a power distribution system and generate an analog signal representative thereof. The base module also includes a processor coupled with the power monitoring circuit, the processor having an analog to digital converter operative to convert the analog signal to a digital signal representative thereof. The processor operates to implement a first power management functionality and generate first power management data. At least one of a display and a communications interface couple with the processor and communicate the first power management data external to the IED. A first interface couples with the processor and the communications interface. The first interface operates to receive a first external function module. The first external function module includes a second power management functionality, where the first interface further facilitates implementation of the second power management functionality.

74 Claims, 27 Drawing Sheets

U.S. PATENT DOCUMENTS

| | | | |
|---|---|---|---|
| 5,192,227 A | | 3/1993 | Bales |
| 5,248,967 A | | 9/1993 | Daneshfar |
| 5,301,122 A | | 4/1994 | Halpern |
| 5,418,752 A | | 5/1995 | Harari et al. |
| 5,418,837 A | | 5/1995 | Johansson et al. ............. 379/58 |
| 5,544,312 A | | 8/1996 | Hasbun et al. ......... 395/183.18 |
| 5,548,527 A | | 8/1996 | Hemminger et al. .......... 702/62 |
| 5,555,508 A | | 9/1996 | Munday et al. ............. 364/492 |
| 5,602,363 A | | 2/1997 | Von Arx |
| 5,654,081 A | | 8/1997 | Todd |
| 5,680,324 A | * | 10/1997 | Schweitzer et al. ......... 370/241 |
| 5,704,805 A | | 1/1998 | Douty et al. |
| 5,736,847 A | | 4/1998 | Van Doorn et al. ......... 324/142 |
| 5,767,790 A | * | 6/1998 | Jovellana ............... 340/870.02 |
| 5,880,927 A | | 3/1999 | Kent et al. |
| 5,896,393 A | | 4/1999 | Yard et al. ................. 371/10.2 |
| 5,907,476 A | | 5/1999 | Davidsz |
| 5,933,004 A | | 8/1999 | Jackson et al. ............. 324/142 |
| 5,936,971 A | | 8/1999 | Harari et al. .............. 371/10.2 |
| 5,994,892 A | | 11/1999 | Turino et al. |
| 6,000,034 A | | 12/1999 | Lightbody et al. .......... 713/202 |
| 6,008,711 A | | 12/1999 | Bolam .......................... 336/92 |
| 6,059,129 A | | 5/2000 | Bechaz et al. |
| 6,064,192 A | | 5/2000 | Redmyer |
| 6,185,508 B1 | | 2/2001 | Van Doorn et al. ........... 702/60 |
| 6,212,278 B1 | | 4/2001 | Bacon et al. ............... 380/240 |
| 6,219,656 B1 | | 4/2001 | Cain et al. .................. 705/412 |
| 6,262,672 B1 | | 7/2001 | Brooksby et al. ........ 340/870.1 |
| 6,275,168 B1 | | 8/2001 | Slater et al. ........... 340/870.02 |
| 6,301,527 B1 | | 10/2001 | Butland et al. |
| 6,367,023 B2 | | 4/2002 | Kling et al. |
| 6,380,949 B2 | * | 4/2002 | Thomas et al. ............. 345/705 |
| 6,397,155 B1 | * | 5/2002 | Przydatek et al. ............ 702/61 |
| 6,401,054 B1 | | 6/2002 | Andersen |
| 6,459,175 B1 | * | 10/2002 | Potega ....................... 307/149 |
| 6,459,997 B1 | | 10/2002 | Andersen |
| 6,486,652 B1 | | 11/2002 | Ouellette et al. |
| 6,493,644 B1 | | 12/2002 | Jonker et al. |
| 6,496,342 B1 | | 12/2002 | Horvath et al. |
| 6,587,873 B1 | * | 7/2003 | Nobakht et al. ............ 709/219 |

OTHER PUBLICATIONS

Lohmann et al., "Enhanced customer value enabled by synergies between protection and control in high voltage substations", Apr. 1996, Power System Control and Management, Fourth International Conference on (Conf. Publ. No. 421), pp. 98–102.*

Swartz, "Interoperability of intelligent electronic devices in a substation", Apr. 1996, Power System Control and Management, Fourth International Conference on (Conf. Publ. No. 421), pp. 187–190.*

Burger, "The utility initiative for interoperability between intelligent electronic devices in the substation–goals and status", Jul. 1999, Power Engineering Society Summer Meeting, 1999. IEEE, vol. 1, pp. 28–30.*

DSP56F801/803/805/807 16–Bit Digital Signal Processor User's Manual Preliminary—Rev. 3.0, ©Motorola, Inc, 2001, 782 pages.

1991, Robert Bosch, "CAN Specification Version 2.0", 68 pages.

A. Lakshmikanth and Medhar M. Morcos, Article "*A Power Quality Monitoring System: A Case Study in DSP–Based Solutions for Power Electronics,*" IEEE Transactions on Instrumentation and Measurement vol. 50. No. 3 Jun. 2001, 8 pages.

Niall Murphy article, Internet Appliance Design "Forget Me Not", Embedded Systems Programming Jun. 2001, 4 pages.

ION® Technology, Meter Shop User's Guide, ©Power Measurement Ltd., Revision Date May 10, 2001, 48 pages.

Electro Industries/Gauge Tech DM Series—specification brochure, "DMMS 425 *Low–Cost Multifunction Power Monitoring Outperforms All Others in its Class*", 4 pages.

Motorola™ Preliminary Information Application Brief "*Electronic Energy Meter with Powerline Modem on DSP56F80x*", DigitalDNA from Motorola, ©2000 Motorola, Inc., 2 pages.

PM130 Serials TrueMeter™—The Low Cost Analog Replacement, specifications, Satec, Inc., 2 pages.

Quick Facts Sheet, "6200 ION Compact Modular Power & Energy Meter", Power Measurement, Dec. 2000, 1 page.

Brochure, "The First True Breakthrough In Solid–State Residential Metering", CENTRON®, 1998, 4 pages.

Manual, "3300 ACM, Economical Digital Power Meter/Transducer—Installation and Operation Manual, Power Measurement, Ltd.", 1999, 79 pages.

Brochure, SENTINEL™ Electronic "Multimeasurement Meter," Schlumberger, Mar., 2001, 4 pages.

*System Manager Software Setup Guide*, Version 3.1, p. 37, 1999.

*POWERLOGIC System Manager™ 3000 Software Family*, Square D Schneider Electric, Bulletin No. 3080HO9601T10/98, Oct. 1999, 6 pages.

*7700 Ion 3–Phase Power Meter, Analyzer and Controller*, pp. 1–8, Nov. 30, 2000.

*7700 ION® User's Guide*, Version 2.0, Appendix pp. A1–A8, Filed as early as Sep. 21, 1998, Power Measurement.

*7700 ION® Revenue Meter Programming Key*, instructions, pp. 1–4, Aug. 6, 1997, Power Measurement.

GIMA® Series Simpson Single–Phase/Three–Phase Power Metering System, Simpson Electric Company, Specification, 4 pages, Dec. 6, 2001.

GIMA® Options Quad Analog Output, Installation and Operation Manual, Simpson Electric Company, pp. 2–15, Jun. 27, 2001.

Three Phases GIMA® Series, Three Phase Digital Panel Meter, Simpson Electric Company, specification, 4 pages, Apr. 24, 2001.

GIMA® Installation and Operation Manual, Simpson Electric Company, pp. 2–31, Jun. 18, 2002.

GIMA Modbus Communications Options Module Instruction Manual, pp. 2–31, Feb. 13, 2002.

* cited by examiner

EXPANDABLE INTELLIGENT ELECTRONIC DEVICE

REFERENCE TO EARLIER FILED APPLICATIONS AND RELATED APPLICATIONS

This application is a continuation in part under 37 C.F.R § 1.53(b) of U.S. patent application Ser. No. 09/791,421, filed Feb. 23, 2001, the entire disclosure of which is hereby incorporated by reference.

The following co-pending and commonly assigned U.S. patent applications have been filed on the same date as the present application. These applications relate to and further describes other aspects of the embodiments disclosed in the present application and are herein incorporated by reference.

U.S. pat. application Ser. No. 09/931,427, "INTELLIGENT ELECTRONIC DEVICE WITH ASSURED DATA STORAGE ON POWERDOWN", filed concurrently herewith.

U.S. pat. application Ser. No. 09/931,527, "APPARATUS AND METHOD FOR SEAMLESSLY UPGRADING THE FIRMWARE OF AN INTELLIGENT ELECTRONIC DEVICE", filed concurrently herewith.

BACKGROUND

The present invention generally relates to Intelligent Electronic Devices ("IED's") and more specifically, to the design and manufacture of a digital power meter. A typical digital power meter is described in U.S. Pat. No. 6,185,508.

One aspect of modern digital power meters is that many of them contain Flash EEPROM memory for storing their firmware, e.g. operating software. This allows the customer to upgrade the firmware in their device. Reasons for upgrading the firmware include adding new features, or correcting defects in the firmware code.

A number of methods for upgrading the firmware within the flash memory of IED's are known in the art. Typically they involve a CPU in a computer sending packets containing the update code to the IED over a communications channel. An example of this method of firmware updating is described in the document entitled "Meter Shop User's Guide", published by Power Measurement Ltd., located in Saanichton, B.C., Canada.

The upgrade of the IED's firmware is normally initiated by the remote CPU (in a computer or other device). Therefore, the IED is not normally involved in the decision as to whether to upgrade its firmware or not. This means that the IED cannot prevent an undesirable upgrade to its code, e.g., if it is in the middle of a critical control operation, or if the new code is not compatible with the IED for some reason. In addition, there must be some intelligence in the remote CPU in order to execute the upgrade and/or provide an interface to the user that is initiating the upgrade. The user must also have intimate knowledge about the new code to ensure it is compatible with the IED.

Another key aspect of IED's is expandability. It is quite common for a user to want to add additional functionality to the device once it has been installed. Typically this will be additional functionality that requires a code change as described above or a change that requires additional hardware. If the change requires additional hardware, the device must often be replaced or at least removed from its installation to add the new hardware component.

Yet another key aspect of IED's is cost. There are many aspects of cost, but two key aspects are initial cost of a basic device and the cost to upgrade a device. Typical IED's contain complex processor memory analog to digital conversion, analog, digital and display circuitry which in many cases is either limited in functionality or formed out of many individual components. In addition, the purchaser of an IED must decide at the time of purchase the amount of functionality they want to have in their IED. An IED with a large amount of functionality will typically cost many times that of one with a limited amount of functionality.

Due to the desire to reduce the cost of the IED, it is common to use components which have reduced capabilities in terms of performance, accuracy, etc. This can lead to a final device which also has reduced performance, accuracy, etc.

DETAILED DESCRIPTION

Manufacturers often supply several versions of a particular device or product to meet different consumer needs. Often the base functionality of the device is the same but enhanced or added features may be included from one device model to another. An exemplary device may include the parent or "entry level" device including base functions such as communication functions, harmonic functions and other power measurement functions. An enhanced version offering features such as scheduling functions, arithmetic functions and increased sliding window demand functionality, or a further enhanced version, may include increased functionality such as waveform recording and sag/swell functionality.

To provide a device that can adapt to accommodate at least some of the features and functions described above, a preferred embodiment utilizes a hardware feature key, that includes a key module and a key code which, when installed on a "base" or "parent" device, configures the base device and allows the user to access and utilize various levels of features. For example, the base device includes the hardware and software functionality to provide many electrical measurements, communications and digital outputs. The hardware feature key controls whether or not any of these features or functions of the device are enabled.

Manufacturing one generic device can allow the manufacturer to decrease production related costs by manufacturing one device instead of multiple similar devices. An exemplary device is type 6200 manufactured by Power Measurement Ltd. located in Saanichton, B.C., Canada. In the exemplary device power management functions, such as voltage and current measurements, are provided on the "base" device, and additional functions, such as harmonics measurement, power factor, real power, reactive energy, apparent energy, reactive power, apparent power, frequency, current demand, voltage demand or other kWh or kW measurements are also provided. It can be appreciated that power management functions include both software calculations and the associated hardware required to perform the calculations, as described in more detail below.

Figure 1A:
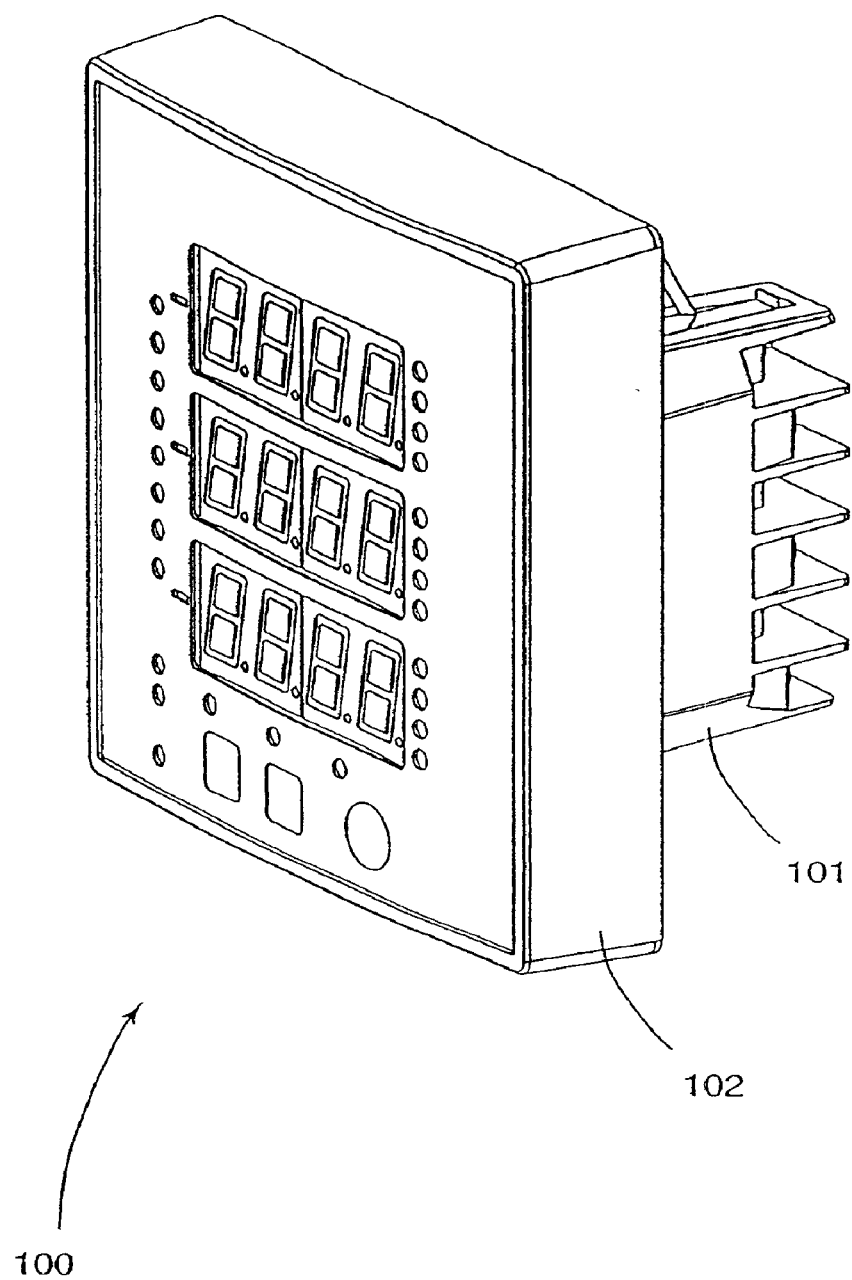
FIG. 1a illustrates a front perspective view of an exemplary device.
Figure 1B:
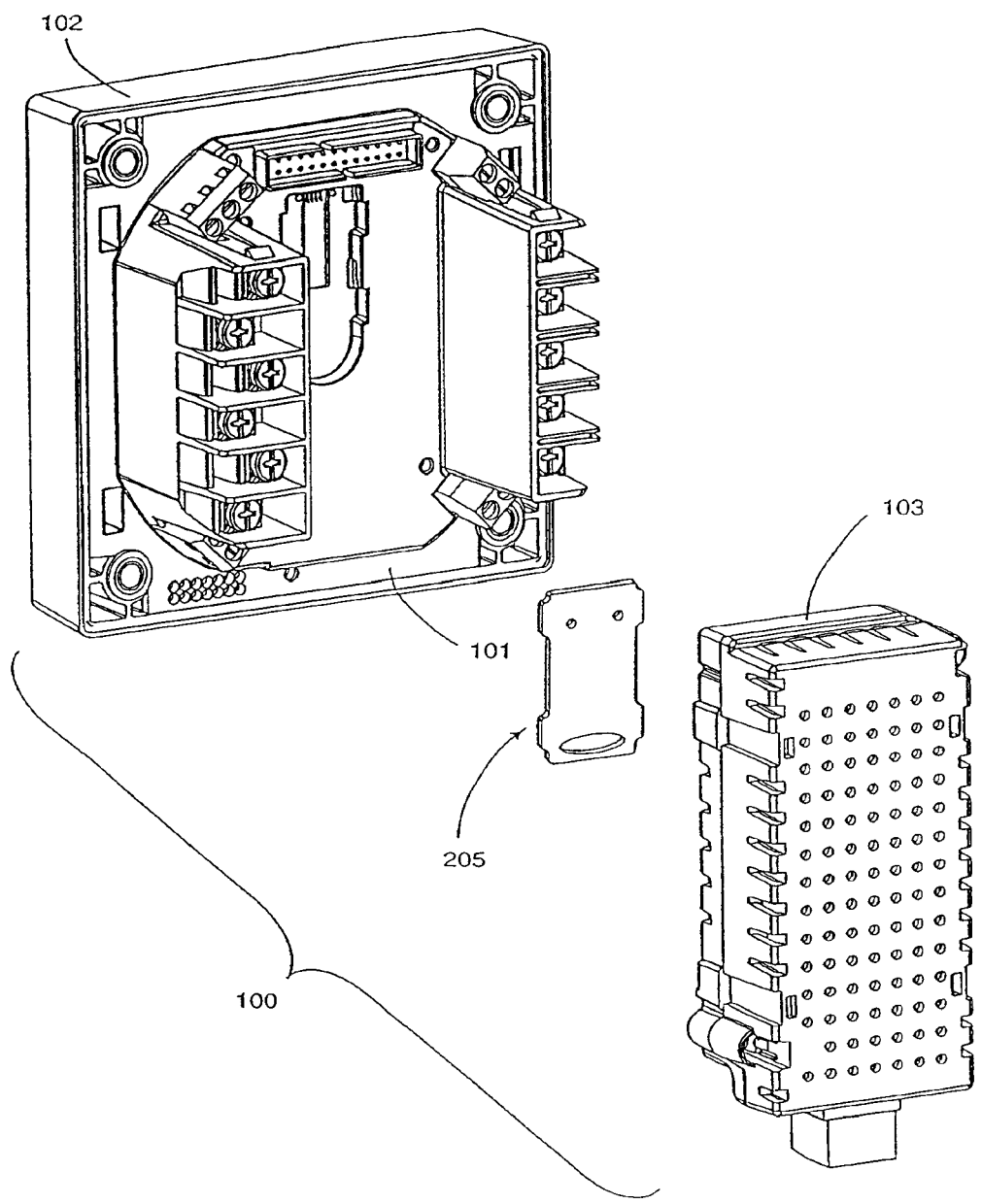
FIG. 1b illustrates a back perspective view of the exemplary device.

Referring now to the drawings, FIGS. 1a and 1b show front and back views of an exemplary device 100, respectively. The device 100 includes a base 101, a cover 102 and a power Supply 103. A feature key 205, that includes a key module containing a key code, connects to the base 101.

Figure 2:
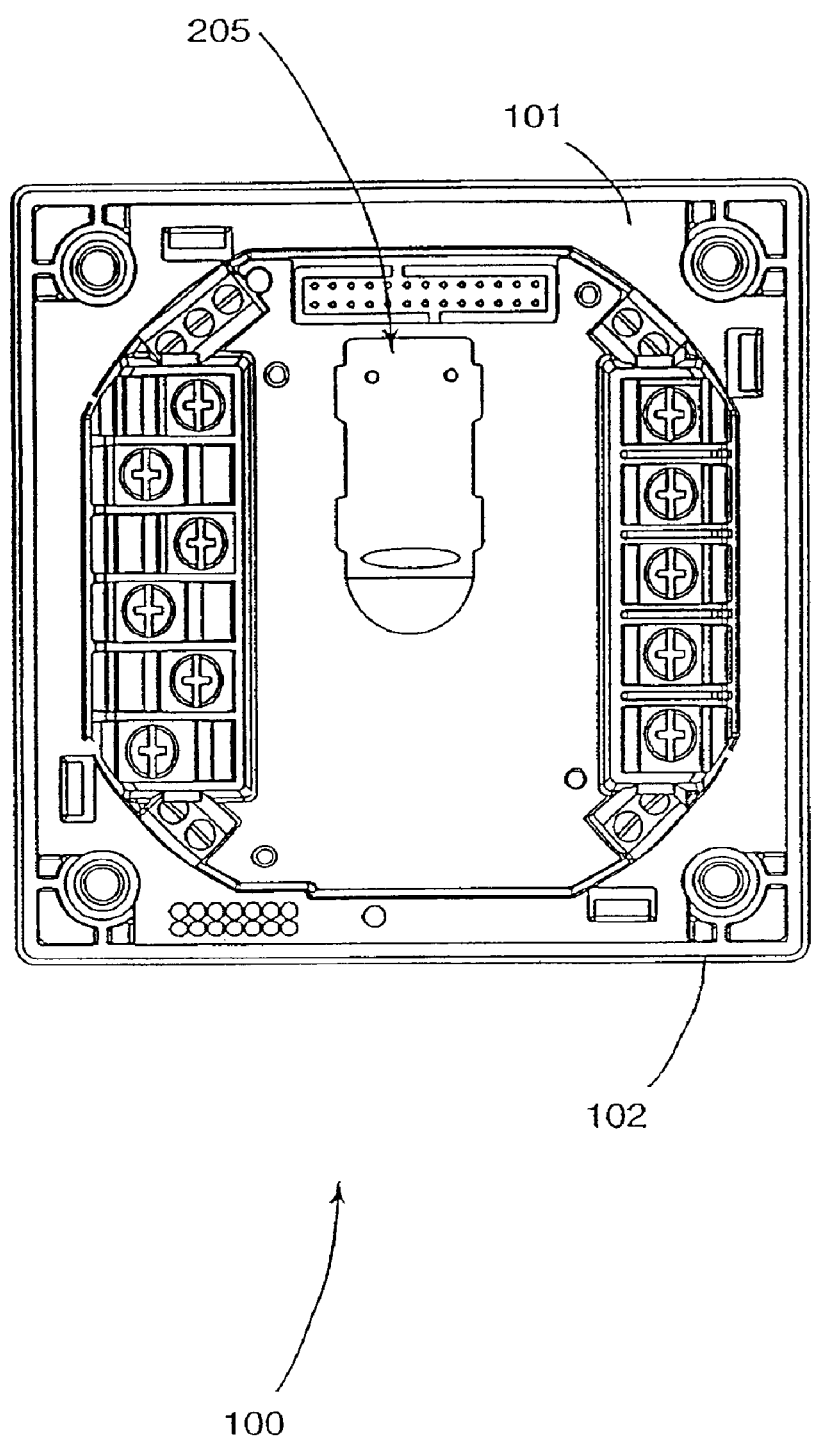
FIG. 2 illustrates a back view of the exemplary device.

FIG. 2 shows a back view of the device 100 with the power supply 103 removed for clarity. The feature key 205, including the key module and the key code, connects to the base 102 and, in a preferred embodiment, is not accessible when the power supply 103 is connected to the device 100. Requiring the removal of the power supply 103 ensures that a user, while using the device as intended, remove the power supply before removal of the feature key 205. Thus the user is prevented from removing the feature key 205 while the device is operating. This prevents a user from enabling the protected features and removing the key while the device is still powered.

In a preferred embodiment the feature key 205 includes a printed circuit board ("PCB") with circuitry placed on the PCB. The circuitry preferably contains a computer chip 310 (FIG. 3a) that is operative to aid in enabling and disabling various data registers, hardware and software features on the device. The computer chip is preferably a semiconductor chip with a one-wire connection to the chip in addition to ground. In operation a command is sent to the chip through the one wire connection, and the chip response is sent back along the same wire. An exemplary computer chip is type DS2432P, manufactured by Dallas Semiconductor, located in Dallas, Tex.

Figure 3A:
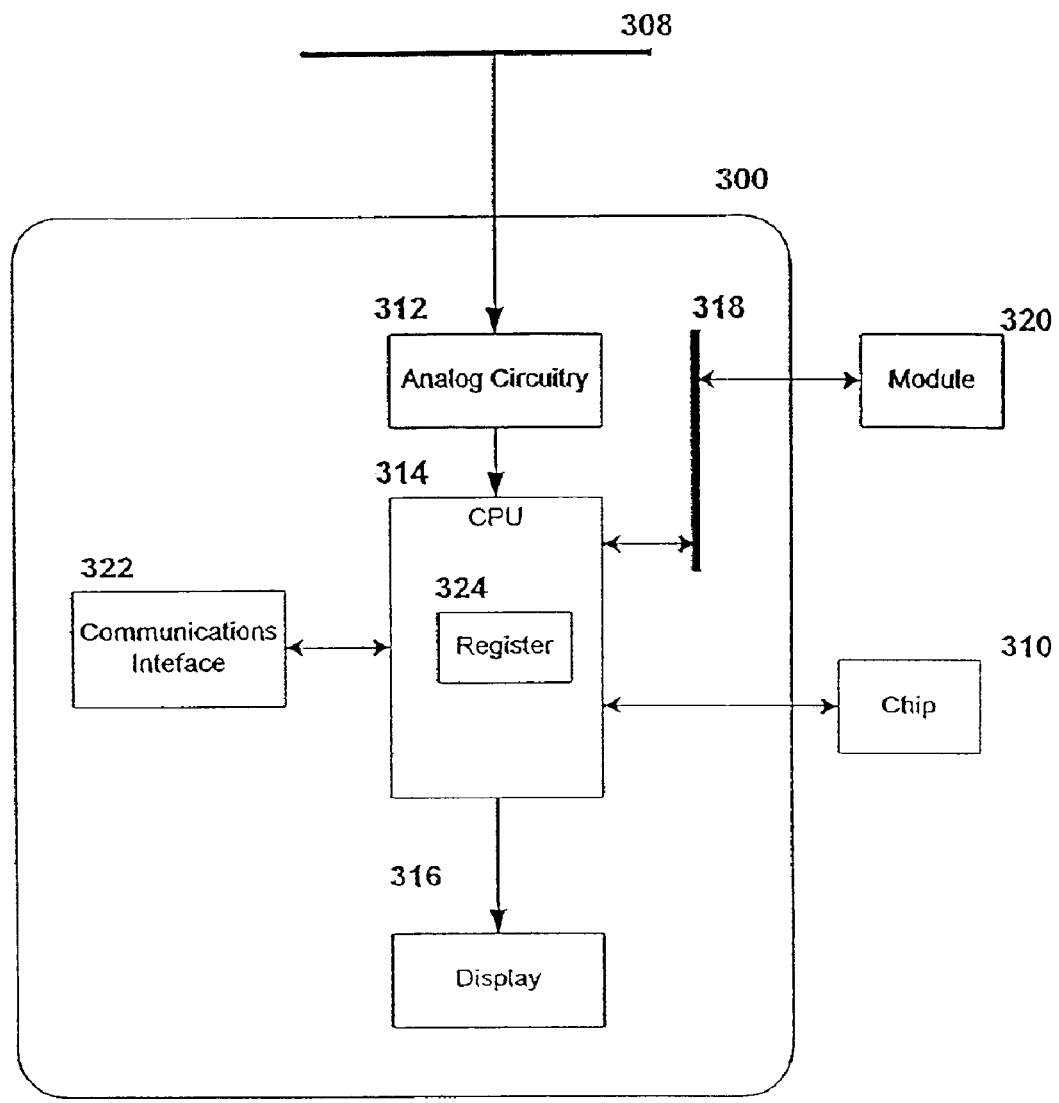
FIG. 3a shows a block diagram representation of the device

FIG. 3a illustrates the computer chip 310 as connected to an IED 300. In a preferred embodiment the IED 300 contains analog circuitry 312 connected to an electric circuit 308, a CPU 314 containing a set of registers 324, a display 316 and a communications interface 322 such as an RS485 port. A data Serial Peripheral Interface ("SPI™") bus 318 connects the CPU 314 and a function module 320 attached to the IED. The CPU further contains a Controller Area Network ("CAN") bus (not shown) which allows the device to communicate with a remote display. In operation the IED stores all data as measured from the analog circuitry 312 and calculated by the CPU 314 into at least one register 324. An exemplary CPU is the DSP56F803 from Motorola Inc., located in Schaumburg, Ill.

The use of the feature key 205 allows for protection of firmware stored in the device as the device will not operate without the feature key 205. Traditional IED's utilize flash memory which contains a "flash lock bit" which enables the manufacturer to load the IED firmware into the memory once, then disable the ability of a user to read the memory. This prohibits unauthorized users from reading and copying the firmware by accessing the CPU's external interface. The device is still enabled to read the memory and run the firmware because the firmware is stored internal to the CPU. An example of a chip containing a "flash lock bit" is the PIC16C67 microcontroller manufactured by Microchip Technologies located in Chandler, Ariz.

In a preferred embodiment the IED 300 is rendered inoperable without a feature key 205, thus preventing unauthorized users from operating the firmware without the key 205. This allows the manufacturer to reduce the need for memory which contains the "flash lock bit" and thus reduce the vulnerability of the firmware to piracy or copying by unauthorized individuals.

Figure 3B:
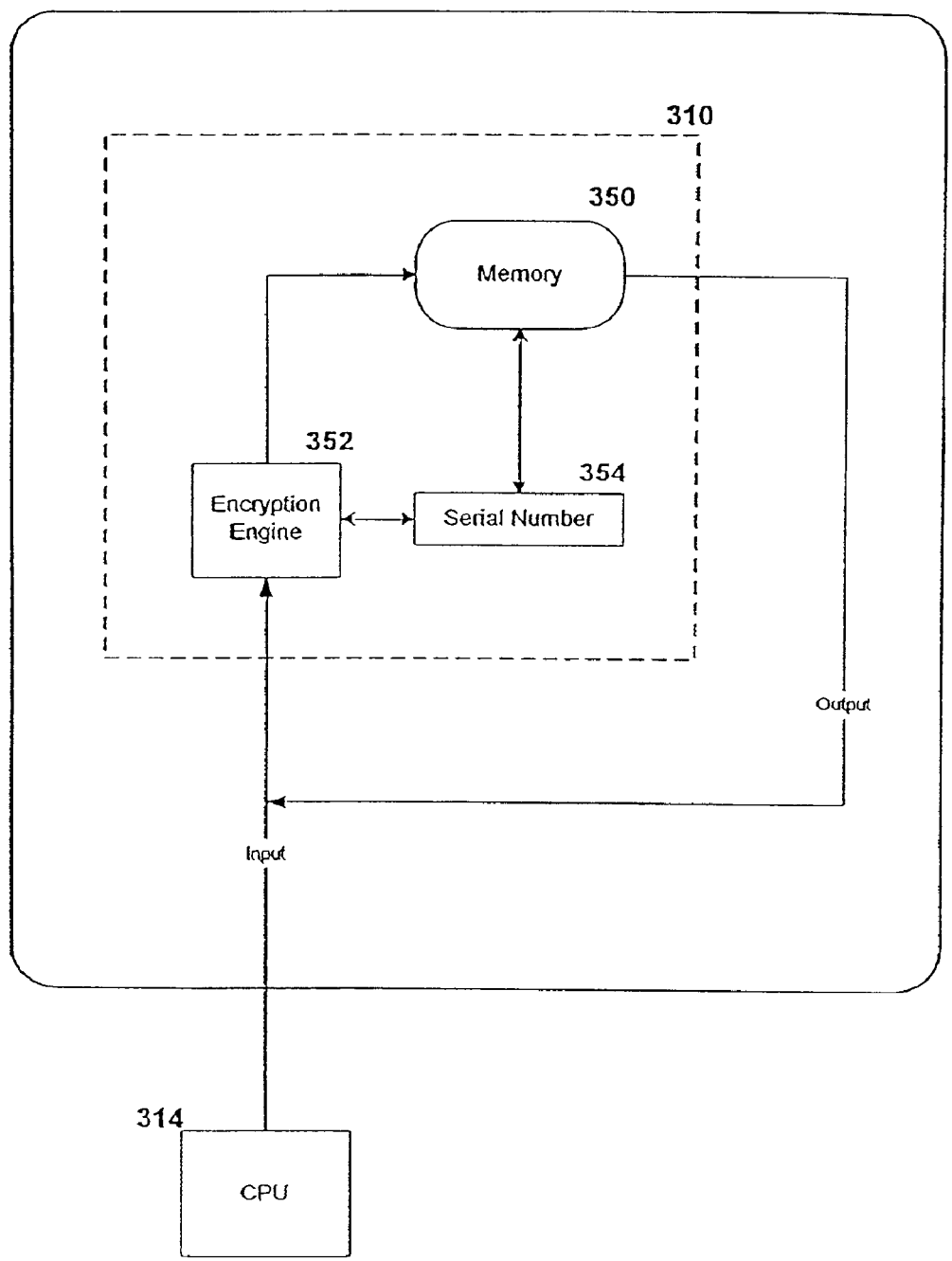
FIG. 3b illustrates a block diagram representation of the chip on the feature key.

As illustrated in FIG. 3b the computer chip 310, which is contained in the feature key's circuitry 330, contains an encryption algorithm engine 352, memory 350 and a unique 64-bit ROM serial number 354 which allows for unique identity. The chip also contains an 8-byte secret code which can preferably be written through the computer chip 310 interface but cannot be read. This 8-byte secret code is located in the memory 350. The combination of the unique serial number and the secret 8-byte code make the chip difficult to duplicate. In a preferred embodiment, an authentication code is created upon power-up of the device and compared to an authentication code on the chip. If the authentication does not match, the IED 300 is disabled. In one embodiment disabling the IED 300 will power down the device and in an alternate embodiment the IED 300 functionality is reduced to only minimal functions, such as displaying an error message or status report.

Figure 4:
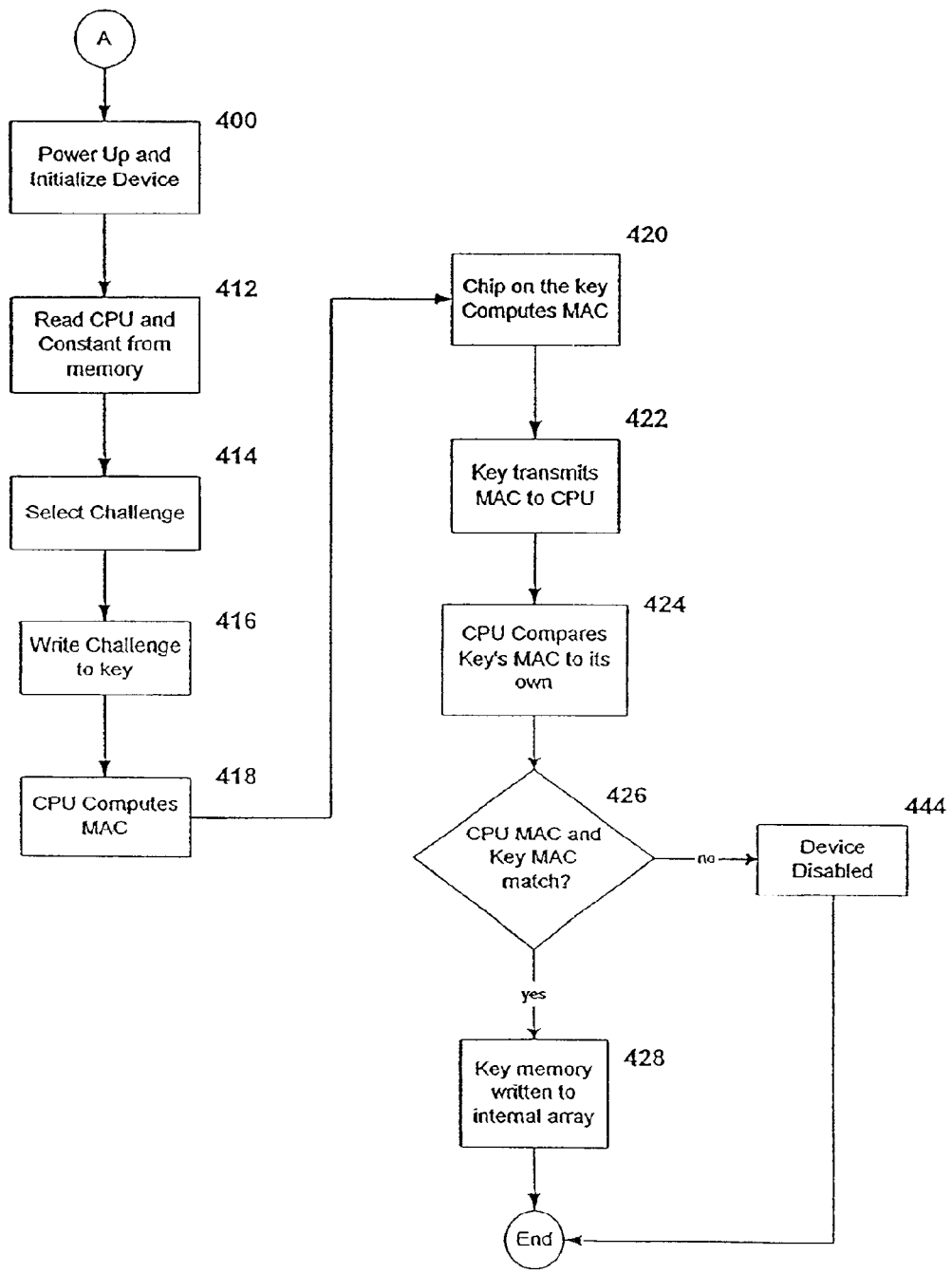
FIG. 4 is a flowchart representation of authenticating the feature key for a single processor.

FIG. 4 illustrates a way to authenticate the activation codes. At block 400, in operation, when the device 100 is first powered up, the chip data on the key is read into a data array in the CPU 314. Chip data includes the unique serial number of the chip, a memory pattern indicating the options that the feature key 205 enables and the family code in the chip 310. The family code specifies the communication requirements of the chip. The memory pattern is written into the computer chip 310 during manufacture of the feature key 205. During manufacture of the feature key 205 an additional secret memory pattern is written to the computer chip 310. This additional pattern cannot be read out of the computer chip 310 and is preferably only known to the manufacturer of the feature key 205. Further, the same secret memory pattern is also programmed into the IED 300 during manufacture.

The CPU 314 then copies the secret memory pattern and constant values required for operation of the chip from its internal non-volatile memory to additional locations in the data array, block 412. In a preferred embodiment the constant values are as required for operation of the chip as specified by the manufacturer. The CPU 314 selects a challenge, block 414, and writes the challenge to the feature key 205, block 416. The challenge is a 3-byte code utilized for additional security in authentication.

Both the CPU 314 and the computer chip 310 calculate a Message Authentication Code ("MAC") based on data in the computer chip 310, the secret, the challenge and the unique serial number, blocks 418 420. The MAC is preferably derived from the Secure Hash Standard SHA-1 which is published in the Federal Information Processing Standards Publication 180-1. The computer chip 310 on the key then transmits its result for the MAC to the CPU 314, block 422, and the CPU 314 compares the MAC received from the key with its own calculation, block 424. If the MAC's match, block 426, the memory pattern indicating the options that the key enables is written to an enabling array on the CPU 314, block 428, and operation of the IED 300 continues. Otherwise, if the MAC's do not match, operation of the device is disabled, block 444. In the preferred embodiment the chip operation, as described above, is done in accordance with the chip manufacturers specifications.

It will be appreciated that the memory pattern indicating the options that the key enables could also be encrypted using any of the methods known in the art, such as public or private key encryption. In addition, it will be appreciated that even greater security could be realized by randomizing the challenge each time the procedure is executed.

Figure 5:
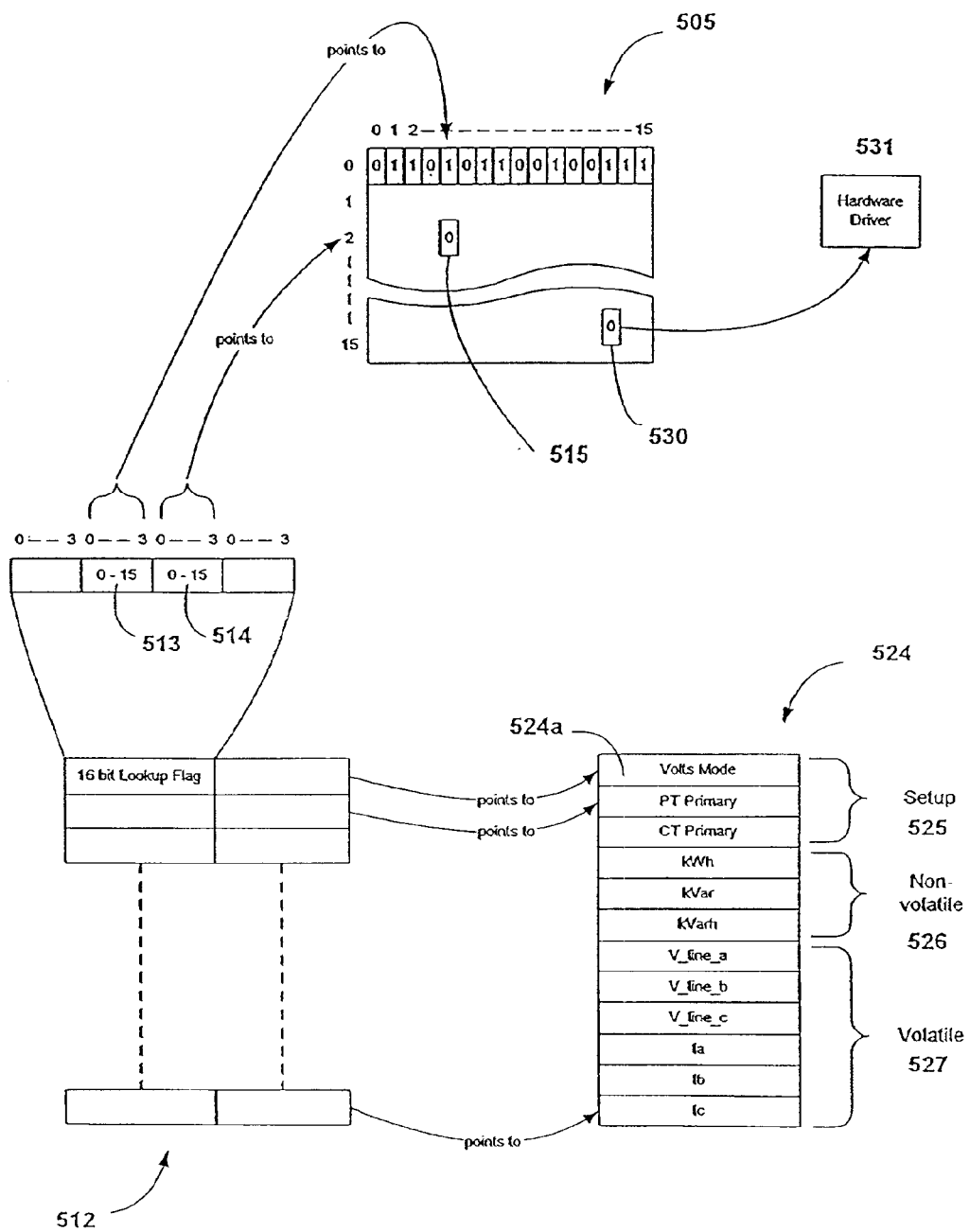
FIG. 5 illustrates an exemplary register according to preferred embodiments.

Referring to FIG. 5, registers 524 are illustrated that store data generated by the IED 300. A first register type 525 contains device configuration data, a second register type 526 contains non-volatile data and a third register type 527 contains volatile data. Preferably, the first register type 525 and second register type 526 sets of data have RAM locations and their contents are periodically backed-up to flash memory (not shown) and the third register type 527 set of data registers exist in RAM. The communications interface 322, as shown in FIG. 3a allows a user to read the registers 524 remotely and the display 316 allows the user to view the data contained in the registers. The computer chip 310 controls the ability to read the contents of a specific register.

Upon successful completion of the key verification sequence, a 256-bit bit-pattern is copied to a RAM location in the device known as the enabling array 505 that is organized in a 16-row by 16-column format. The enabling array 505 is part of the key code of the feature key 205. Those skilled in the art will appreciate that other formats for the enabling array could be used. A flag lookup table 512 contained in the firmware of the device contains a 32-bit field corresponding to each register. Eight of the 32 bits are dedicated to security of the specific register, the first four bits 513 of those eight bits point to the row index position in the enabling array and the latter four bits 514 point to the column index position in the enabling array 505. Based on the values present 515 in the enabling array 505, access to the register 524a is either permitted or denied.

For example, if the eight security bits on the lookup table 512 point to the fifth column 513 and the third row 514 of the enabling array 505, a cell position 515 containing '0' means that the register 524a corresponding to that 32 bit field is disabled. Attempts to access a disabled register can result in an error condition being returned. However, if the eight security bits on the lookup table 512 points to a position containing '1' in the enabling array 505, the register cell 524a is enabled and can be accessed. The security of access ('1') and no access ('0') is maintained in time enabling array 505. Those skilled in the art will appreciate that other values could be used to represent access and no access, such as access ('0') and no access (1'). The lookup table 512 is part of the device firmware and is associated with the same cell 515 in the enabling array 505. Changing or replacing the key 310 can be used to update the enabling array 505.

FIG. 5 also illustrates how the feature key 205 controls access to various hardware features. The hardware driver 531, a section of the firmware which controls the operation of a specific hardware function, is allocated an index position 530 in the enabling array. After power-up, each of the hardware drivers performs an initialization sequence to put the hardware in a known state, ready for operation. During the initialization sequence, the hardware driver checks its index position in the enabling array. As above, if the bit is zero, then the hardware is put into an inoperative state, if the bit is one, then the hardware is enabled for normal operation, or vise versa.

Figure 6:
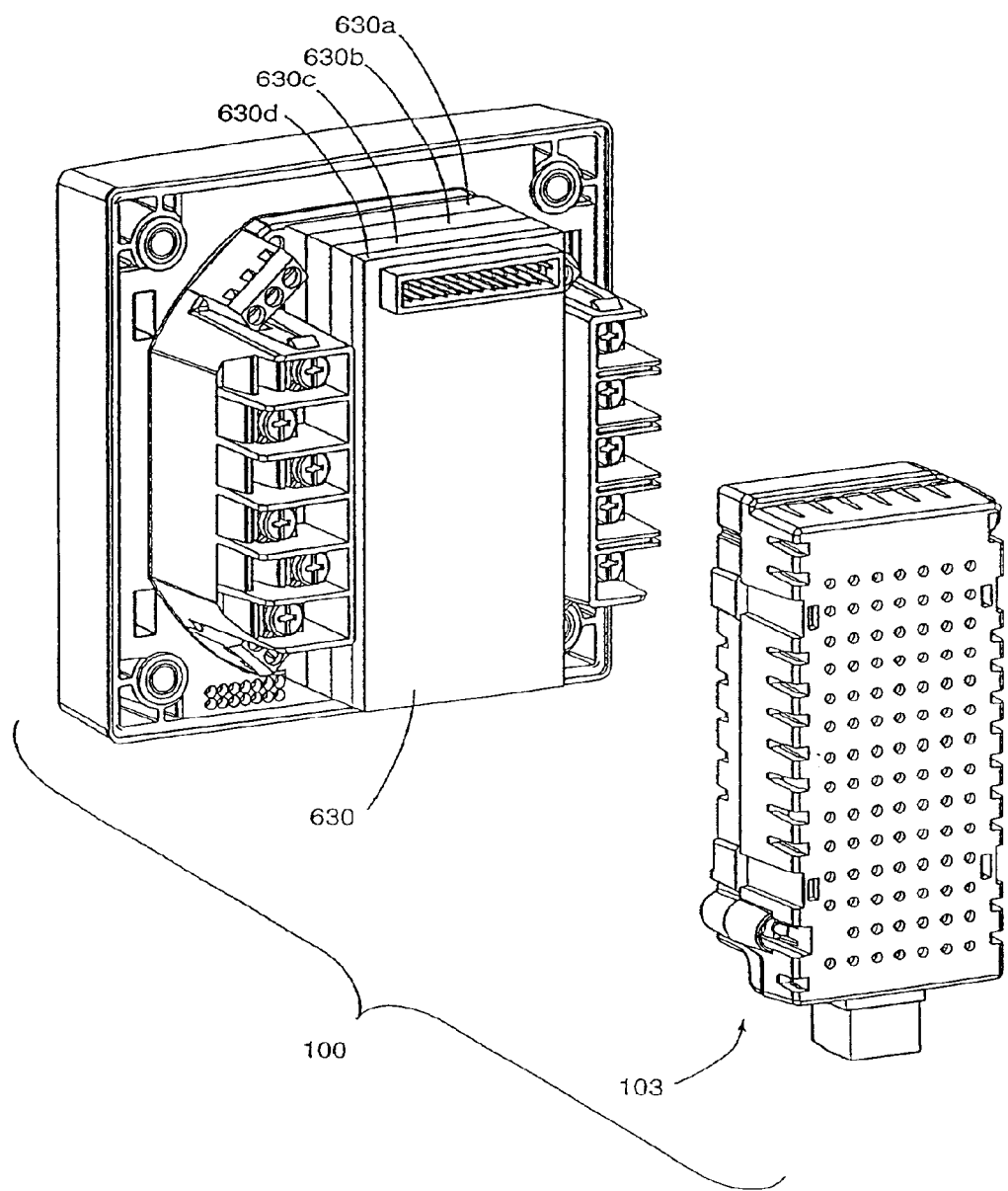
FIG. 6 illustrates a back perspective view of the exemplary device with attached modules.

Referring now to FIG. 6, a back view of the device 100 is shown with multiple external function modules 630a 630b 630c 630d attached to the device 100. The external function modules 630 offer expandable features to the basic device. For example, modules may contain additional power management features, both hardware and software based, such as additional communications, advanced communications, wireless communications, analog inputs/outputs, digital inputs/outputs, data or energy logging features, Ethernet connections, communication protocol capabilities, such as Lonworks™ capabilities, additional memory options or processing power for measurement, analysis and control. Further, other communications and connections such as optical communications, wireless communications and various other types of telephony communications may be utilized by a module.

Modules typically have the capability of retrieving or generating data, or a combination of both. Of these features the software calculation based power management features may include (data such as voltage and current measurements, harmonics measurement, power factor, real power, reactive energy, apparent energy, reactive power, apparent power, frequency, current demand, voltage demand or other kWh or kW measurements. Power management functions may include power measurement functions, such as measuring voltage and current, as well as power management functions, such as calculating power. Additionally, power management functions may be utilized to monitor and/or measure control power quality, protection, control or data logging on non-electrical parameters such as oil, gas, water, heat or steam.

In a preferred embodiment the enabling of the module functions is automatically done by default and in an alternate embodiment enabling the modules is done via the feature key 205. The use of a feature key 205 combined with added modules also allows the device to be easily upgraded in the field as a device can have a module or new feature key replaced or installed without taking the device out of service. In a preferred embodiment the modules are attached to a pass through connector which enables the power supply to be attached last. This pass through connector, e.g., containing the SPI™ bus 318, as shown in FIG. 3, connects the function modules 630 the power supply 103 and the main circuitry and CPU 314 on the device. In the preferred embodiment the communications between the power supply 103, external function modules 630 and the device circuitry is done using a custom protocol, however, it can be appreciated that a standard protocol, such as Peripheral Connect Interface (PCI) bus, VME bus or other protocols known in the art. It can be appreciated that the communications transfers can be both encrypted and unencrypted. Further, in the preferred embodiment the addition of extra function modules 630 requires the removal of the power supply 103, thus the user is prohibited from removing the feature key once the device has authenticated and enabled the hardware.

It can be appreciated that in certain situations only the feature key 205 need be upgraded to increase functionality of the device if the supporting hardware exists or alternately only modules need be added or upgraded if the feature key 205 supports the addition of this new hardware. For example, a customer orders a device with only the base functionality of monitoring voltage, current and power, but later wishes to upgrade the device to monitor energy data, such as kWh. Although the device already monitors and records energy data, the feature key 205 disables the access to the data as described above. The upgraded feature key 205 enhances the functionality of the device by providing access to kWh data without the replacement of measurement hardware or the replacement of firmware.

In an alternate embodiment the function modules 630*a*–*d* completely replace the authenticating and enabling hardware of the meter, by reading the feature key directly. This permits the addition of new modules that were not envisioned when the original meter was designed.

When function modules 630*a*–*d* are added to the base unit 101 the module may require read access or write access or both read and write access to the register set on the base unit. This is accomplished by transferring register values between the base unit and the module. This transfer requires that the module enforce the same security restrictions as those dictated by the security key on the base unit. The flag lookup table 512 is preferably included in the firmware of the module. In order to operate correctly, the module also has access to an enabling array to act in conjunction with the flag lookup table, as outlined above.

Figure 7:
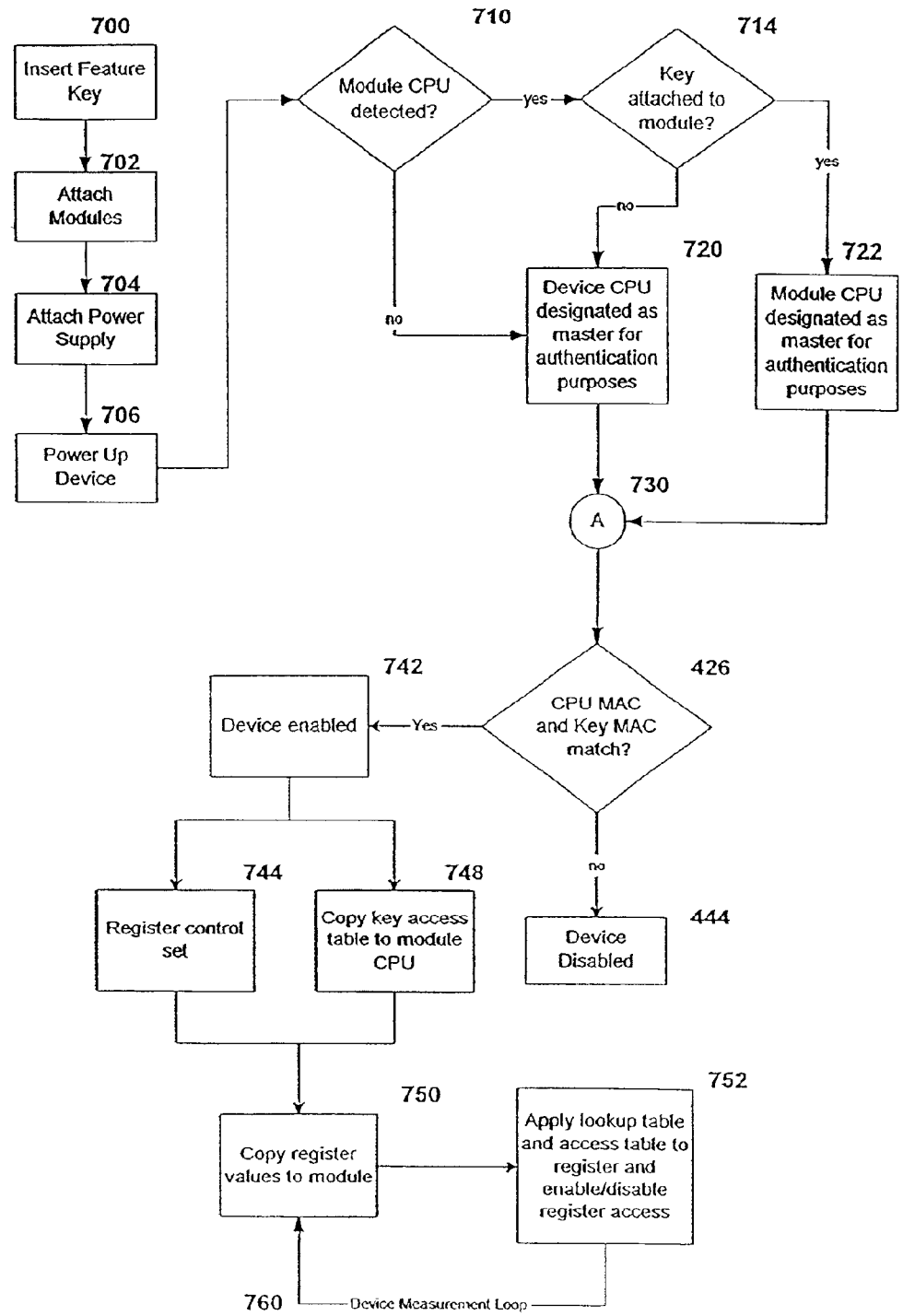
FIG. 7 is a flow chart representation of an alternate way to authenticate the feature key for multiple processors.

FIG. 7 is a flowchart illustrating the steps involved in authenticating the activation codes with added modules. In operation the power supply 103 is disconnected from the device and the feature key 205 is replaced with an upgraded feature key, block 700. In an alternate embodiment the module may have the ability to accept an additional key that overrides the original key attached to the device. This allows a user to install an upgraded module and associated key which embodies the features and functions not envisioned or supported in the original base device. In either case an upgraded or additional feature key allows for the addition of the module functionality to the device.

Once the feature key has been upgraded the modules 630 are connected to the device, block 702, and the power supply is connected 704. As illustrated in FIG. 3, the device, the power supply and the modules are all connected via a bus 318, thereby allowing data transfer between them. Upon initial power up of the device, block 706, the device checks the modules to see if an additional processor, the auxiliary processor, is provided with the module, block 710. If no auxiliary processor is detected, the processor on the base unit is used for authentication purposes, block 720.

If an auxiliary processor is detected in the attached module, the base unit 101 searches for a feature key 205 attached to the module, block 714. If a feature key 205 is found attached to the module, the auxiliary processor is designated as the master processor For authentication purposes, block 722. If no feature key 205 is found to be attached to the module, then the device processor is designated as the master processor for authentication purposes, block 720 and the feature key located on the device is utilized.

Again, allowing the module to contain an auxiliary processor allows the module to act either as an extension of the original base device, and the base device's associated CPU, or act as master CPU for the entire device. Further, the ability to add a module with a feature key 205 allows the user to override the device processor and original feature key embedded and attached to the original device. This allows for ease of upgrading a device, such as firmware or software upgrades, or adding future modules to perform calculations or functions which are too advanced for the device processor to handle. In an alternate embodiment the module CPU reads the feature key 205 directly performing the required authentication, as outlined earlier.

The master processor for authentication purposes then goes through the same procedure as outlined in FIG. 4 blocks 410–426 for the single processor case, block 730. As before, the device is disabled 444 or, in an alternate embodiment, the IED functionality is reduced to only minimal functions, such as displaying an error message or status report. If the device is enabled, block 742 the key memory is written to an internal array, and the register control is set, block 744. Also, the enabling array is copied from the authentication master device to the slave devices, block 748. Specifically, if the module is the master, the enabling array is copied to the device. If the main unit is the master, then the enabling array is copied to the module. Next the values in the data register measured by the device are copied to the module 750 and the access table and lookup table are applied to both the module register and the device register. As before, to enable or disable access to the data in the register the lookup table flag accesses the access table and returns a '0' or '1' based on the index location provided by the flag, and then disables or enables the access to the associated register's data 752. The register control allows the device and the module to maintain a coherent access policy.

The addition of modules to the device implies a multi-processor/multi-master architecture, since either the device or the module may wish to assert control over a specific register. In a preferred embodiment the default value is all register fields, unless specified, are controlled by the device CPU 314. The device and module constantly record and update data into the respective registers, or a specific register, and the registers are copied between the device and module 760. As described earlier, a master read/write control is set between the device and module registers to ensure the appropriate data is current.

Intelligent electronic devices ("IED's") such as programmable logic controllers ("PLC's"), Remote Terminal Units ("RTU's"), electric/watt hour meters, protection relays and fault recorders are widely available that make use of memory and microprocessors to provide increased versatility and additional functionality. Such functionality includes advanced processing and reporting capabilities. Typically, an IED, such as an individual power measuring device, is placed on a given branch or line proximate to one or more loads which are coupled with the branch or line in order to measure/monitor power system parameters. Herein, the phrase "coupled with" is defined to mean directly connected to or indirectly connected through one or more intermediate components. Such intermediate components may include both hardware and software based components. As used herein, Intelligent electronic devices ("IED's") include Programmable Logic Controllers ("PLC's"), Remote Terminal Units ("RTU's"), electric power meters, protective relays, fault recorders and other devices which are coupled with power distribution networks to manage and control the distribution and consumption of electrical power. Such devices typically utilize memory and microprocessors executing software to implement the desired power management function. IED's include on-site devices coupled with particular loads or portions of an electrical distribution system and are used to monitor and manage power generation, distribution and consumption. IED's are also referred herein as power management devices ("PMD's").

A Remote Terminal Unit ("RTU") is a field device installed on an electrical power distribution system at the desired point of metering. It is equipped with input channels (for sensing or metering), output channels (for control, indication or alarms) and a communications port. Metered information is typically available through a communication protocol via a serial communication port. An exemplary RTU is the XP Series, manufactured by Quindar Productions Ltd. in Mississauga, Ontario, Canada.

A Programmable Logic Controller ("PLC") is a solid-state control system that has a user-programmable memory for storage of instructions to implement specific functions such as Input/output (I/O) control, logic, timing, counting, report generation, communication, arithmetic, and data file manipulation. A PLC consists of a central processor, input\output interface, and memory. A PLC is designed as an industrial control system. An exemplary PLC is the SLC 500 Series, manufactured by Allen-Bradley in Milwaukee, Wis.

A protective relay is an electrical device that is designed to interpret input conditions in a prescribed manner, and after specified conditions are met, to cause contact operation or similar abrupt change in associated electric circuits. A relay may consist of several relay units, each responsive to a specified input, with the combination of units providing the desired overall performance characteristics of the relay. Inputs are usually electric but may be mechanical, thermal or other quantity, or a combination thereof. An exemplary relay is the type N and KC, manufactured by ABB in Raleigh, N.C.

A fault recorder is a device that records the waveform and digital inputs, such as breaker status which resulting from a fault in a line, such as a fault caused by a break in the line. An exemplary fault recorder is the IDM, manufactured by Hathaway Corp in Littleton, Colo.

A power meter, is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power which they are metering. An exemplary revenue meter is the model 8500 meter, manufactured by Power Measurement Ltd, in Saanichton, B.C. Canada.

Figure 8:
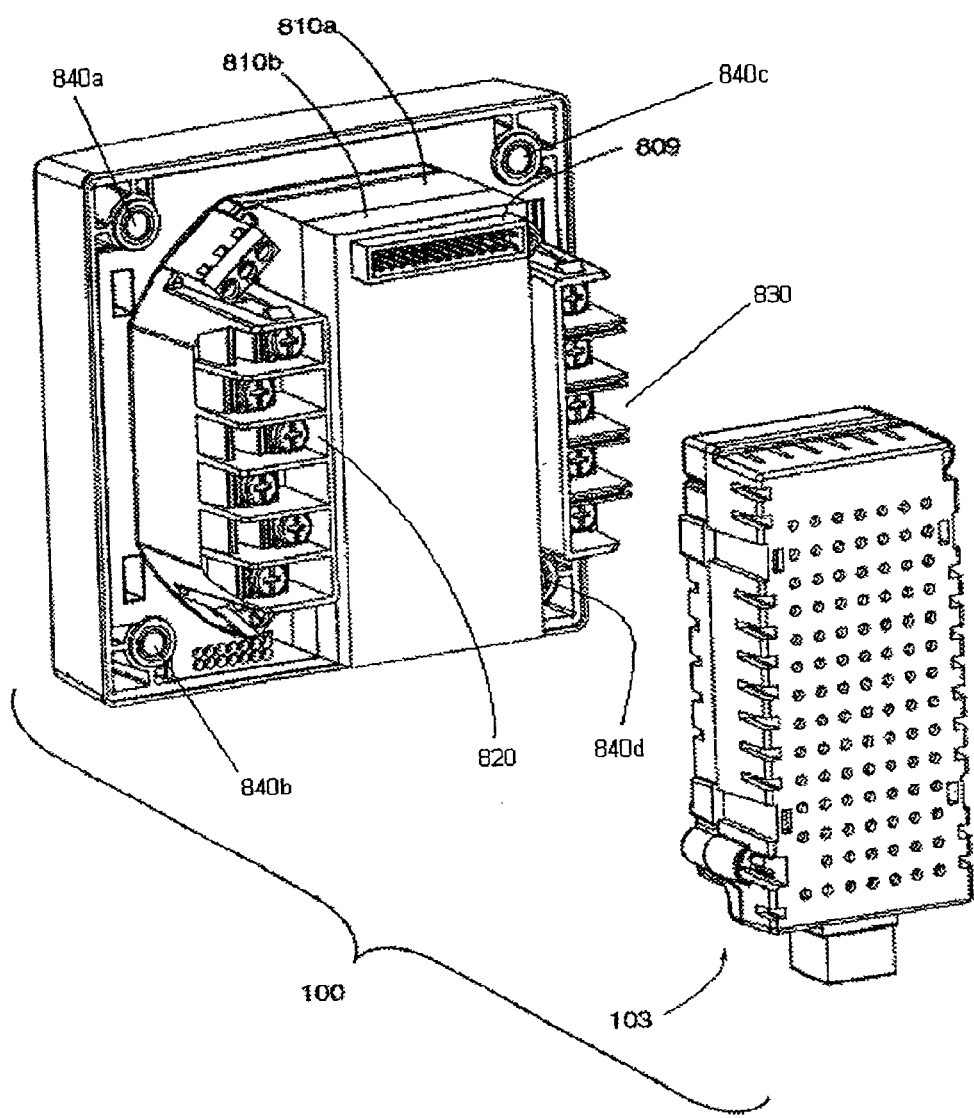
FIG. 8 depicts a back view of the enclosure of the power meter of the present invention including the mechanical arrangement of the power supply and external function modules.

Referring again to the drawings, FIGS. 1a and 8 show front and back views of an exemplary device 100, respectively. As discussed above, in the preferred embodiment the exemplary device 100 is a power meter, such as type 6200 manufactured by Power Measurement Ltd, located in Saanichton, B.C. The device 100 consists of a base 101, cover 102, power supply 103 and external function modules 810a 810b (could be the same as or different from function modules 630a–d discussed above). The base 101, external function modules 810a 810b and power supply 103 are interconnected through connector 809 which terminates inside the base 101 and at the power supply 103 while passing through the external function modules 810a 810b, also referred to as "snap-on" modules. It is important to note that external function modules 810a 810b are not required for the device 100 to operate. For example, by attaching the power supply 103 directly to the base 101, the device 100 will operate with a base level of functionality.

It will be noted that the device 100 can be installed into a switchgear panel by inserting screws or bolts through the panel and into mounting locations 840a 840b 840c 840d. Thus, the base 101 and cover 102 are secured to the switchgear panel, but the external function modules 810a 810b and power supply 103 can be removed without removing the rest of the device from the panel. This allows cabling attached to the various ports on the device such as current inputs 820 and voltage inputs 830 to remain installed when any of the attached modules 810a 810b 103 are removed.

Figure 9:
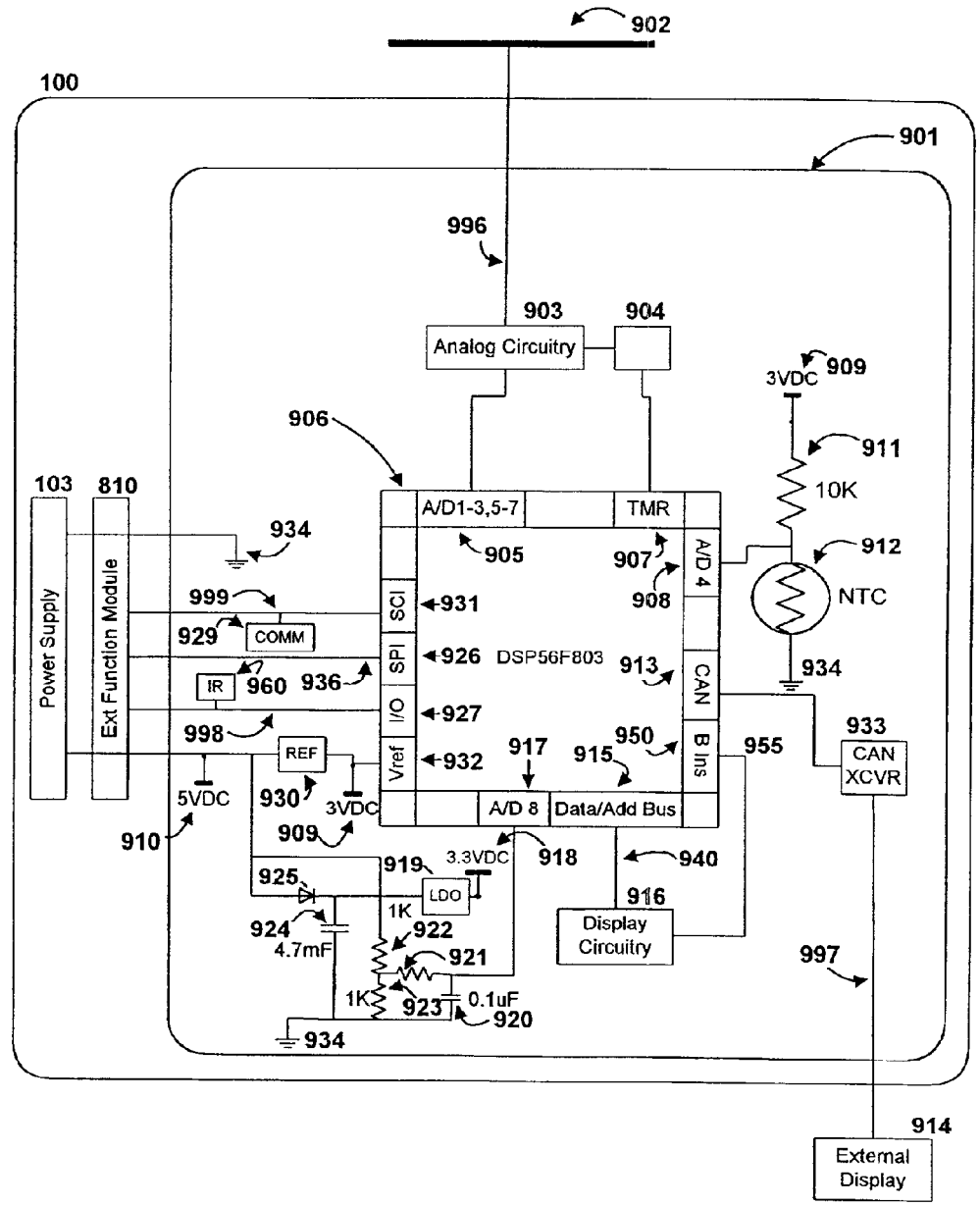
FIG. 9 depicts a block diagram of the internal circuitry of the power meter of the present invention.

FIG. 9 shows a block diagram of an alternate embodiment of the circuitry 901 inside the base 101 of the device 100 and the interfaces 996 997 998 999 936 from the base 101 to various other subsystems. A processor 906 is located within the device 100. An exemplary processor 906 is the DSP56F803 manufactured by Motorola Inc., located in Schaumburg, Ill. For clarity, only the connections relevant to the description of the present invention are shown in the figures whereas the remaining input/output pins of the processor 906 are used or terminated in manners known in the art and suggested by the manufacturer. The relevant connections are the A/D inputs 1–3 and 5–7 905, timer input 907, A/D 4 input 908, controller area network ("CAN") interface 913, Data and address bus pins 915, A/D 8 input 917, Vreference 932, I/O 927, SPI 926 and SCI 931. These connections will be described in detail below.

The device 100 is typically connected to a 3-phase power system 902 through analog circuitry 903 as known in the art. The analog circuitry 903 conditions the signals from the power system 902 such that they fall within the acceptable voltage range of the micro-controller's A/D inputs 1–3 and 5–7 905. A sine-wave to square wave converter 904 as described in U.S. Pat. No. 6,185,508 is also connected to the analog circuitry 903 and feeds a square wave signal indicative of the fundamental frequency of the power system 902 to a timer input 907 of the processor 906. This allows the processor 906 to determine the frequency of the power system 902 as will be described later.

The power supply 103 and one external function module 810 are shown on FIG. 9 in block form for simplicity. The power supply provides 5VDC 910 and a ground return 934 for the device 100 and external function modules 810a, 810b.

The 5VDC 910 is fed into voltage reference chip 930 which produces 3VDC 909. The reference chip is preferably an LT1460KCS3-3 manufactured by Linear Technology Corporation, located in Milpitas Calif., configured in a manner known in the art.

The 5VDC line 910 is also fed through diode 925 and into Low Dropout Regulator ("LDO") 919 to create 3.3VDC 918. 3.3VDC is used to power the processor 906 and other circuitry within the device 100. The LDO 919 is preferably the LM3940IMPX-3.3 manufactured by National Semiconductor, located in Santa-Clara Calif. The diode 925 is preferably the SS12 manufactured by General Semiconductor Inc., located in Melville N.Y.

The processor's 906 fourth A/D input 908 measures a signal generated by dividing the 3VDC signal 909 with the combination of resistor 911 and Negative Coefficient Resistor (NTC) 912 This signal is indicative of the temperature within the device 100. An exemplary NTC is the B57620C103M62 manufactured by Epcos AG, located in Munich Germany.

The processor's 906 data and address bus pins 915 drive display circuitry 916, described in more detail below, through the data/address bus 940. The operation of the display circuitry will be described later. The processor's 906 Controller Area Network ("CAN") interface pins 913 interface with an external display 914 through a CAN transceiver 933. The presence of the onboard display circuitry 916 and the external display 914 may be mutually exclusive, i.e., in one embodiment of the present invention, the device 100 has onboard display circuitry coupled with an onboard display and another alternative embodiment, the device 100 has an external display 914. In still another alternative embodiment, the device 100 has both an onboard display and is connected with an external display. Alternatively, the device 100 has neither an onboard display nor an external display. The CAN standard is defined in the Bosch CAN Specification Version 2.0 document published by Robert Bosch GmbH, located in Stuttgart Germany.

Asynchronous Serial Communications Interface ("SCI") pins 931 on the processor 906 interface through communications interface circuitry 929 in a manner known in the art to provide RS-485 communications with external devices. The SCI lines also connect to the external function module 810 such that either the processor 906 or the external function module 810 can interface with the RS-485 communications circuitry 929.

Button input pins 950 receive signals from the button input bus 955 which connects to the display circuitry 916.

Serial Peripheral Interface (SPI) pins 926 connect to the external function modules 810 through SPI bus 936 as will be described later.

Additional general purpose I/O pins 927 of the processor 906 connect to the external function modules for various purposes including interfacing with Infra-Red ("IR") port 960 such that either the processor 906 or the external function module 810 can interface with the IR port 960.

I. Upgrade

Figure 19:
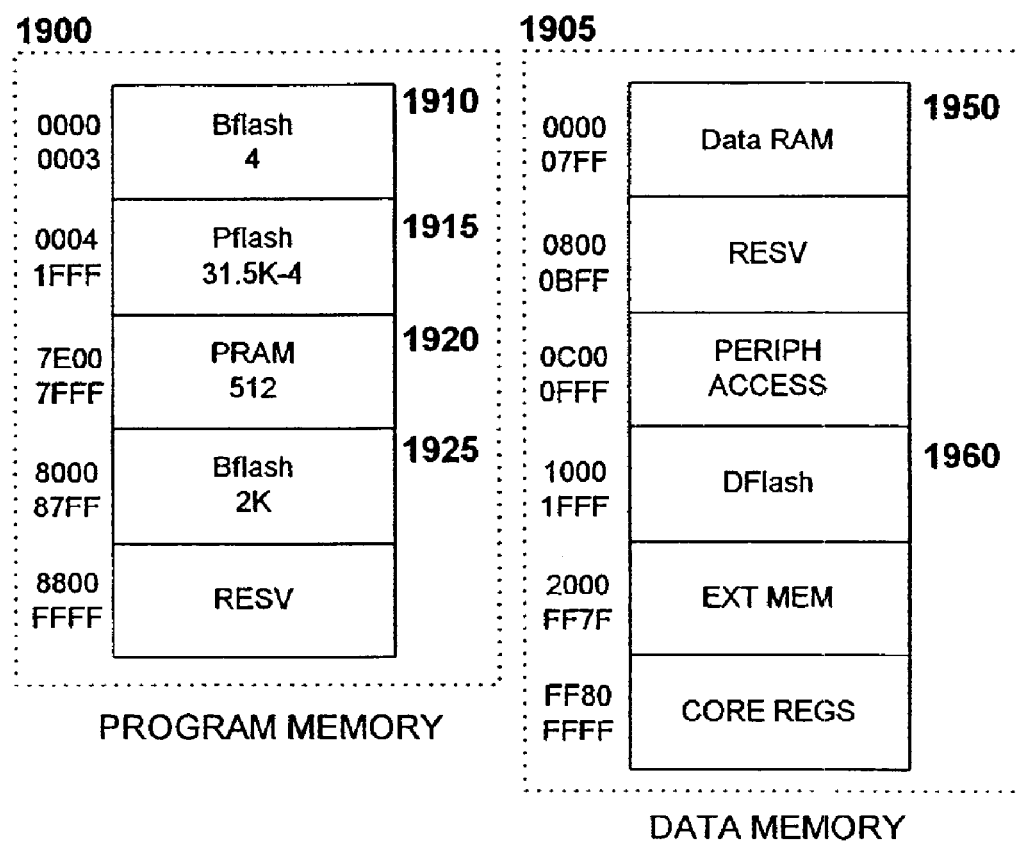
FIG. 19 depicts a block diagram of the internal memory structure of the main processor of the present invention.
Figure 20:
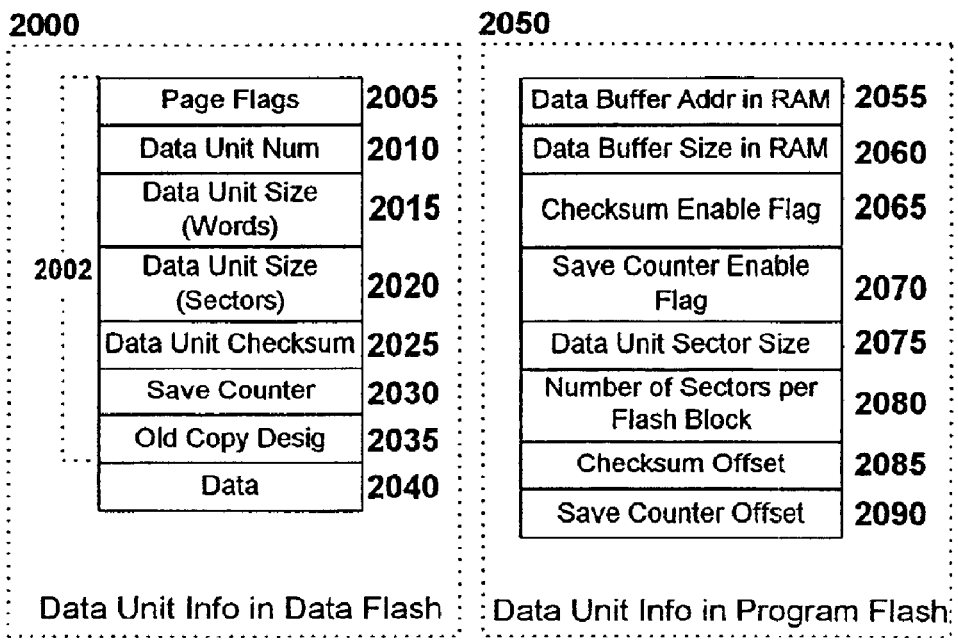
FIG. 20 depicts a block diagram of the data unit structure within the memory of the main processor of the present invention.

The processor 906 contains integrated flash memory divided into three different types. Referring now to FIG. 19, the program memory area 1900 and data memory area 1905 of the processor 906 are diagrammed. Program flash memory 1915 provides storage for the main program code. Boot flash memory 1925 provides storage for program code that executes during processor startup. Data flash memory 1960 provides storage for data. Note, the first 4 words of boot flash memory 1925 are mirrored 1910 in the first four memory locations. For an in depth description of the flash systems on the DSP56F803, refer to the document entitled DSP56F80X User's Manual published by Motorola Inc., located in Schaumburg, Ill., which is herein incorporated by reference.

Often, due to "bugs" in the code, the desire for additional features, or increased or altered functionality, it becomes necessary for the program flash memory 1915 to be re-programmed with new code. Typically this will occur when the device is installed in the field and it is no longer possible to remove the device from its installation.

Figure 10:
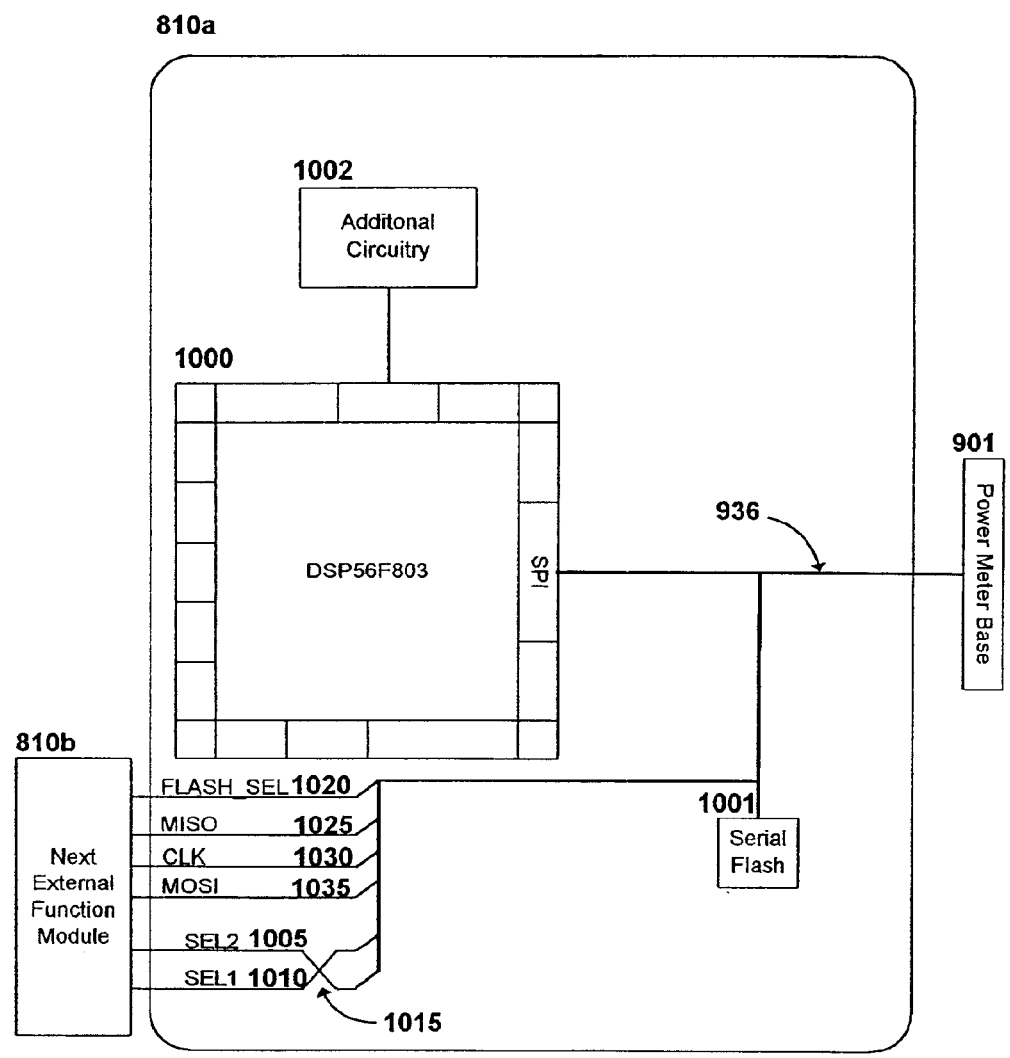
FIG. 10 depicts a block diagram of the internal circuitry of the external function module of the present invention.

Referring now to FIG. 10, a block diagram of the internal circuitry of a typical external function module 810 is shown. Note, both external function module 810*a* and 810*b* are identical in their basic structure although they may perform different functions. Only those components critical to the teaching of the present invention are shown. One of ordinary skill in the art will appreciate that additional components 1002, such as power regulation circuitry, external memories, crystal circuitry, etc. may be needed to make the external function module operate. The external function module contains a processor 1000 and a serial flash memory 1001. Both the serial flash 1001 and processor 1000 are slaves on the SPI bus 936 and the processor 906, (shown in FIG. 9) in the base circuitry 901 is the master. The master selects which slave to communicate with in a manner known in the art. The serial flash 1001 is preferably the AT45DB021 B manufactured by Atmel Corporation located in San Jose Calif.

Figure 11A:
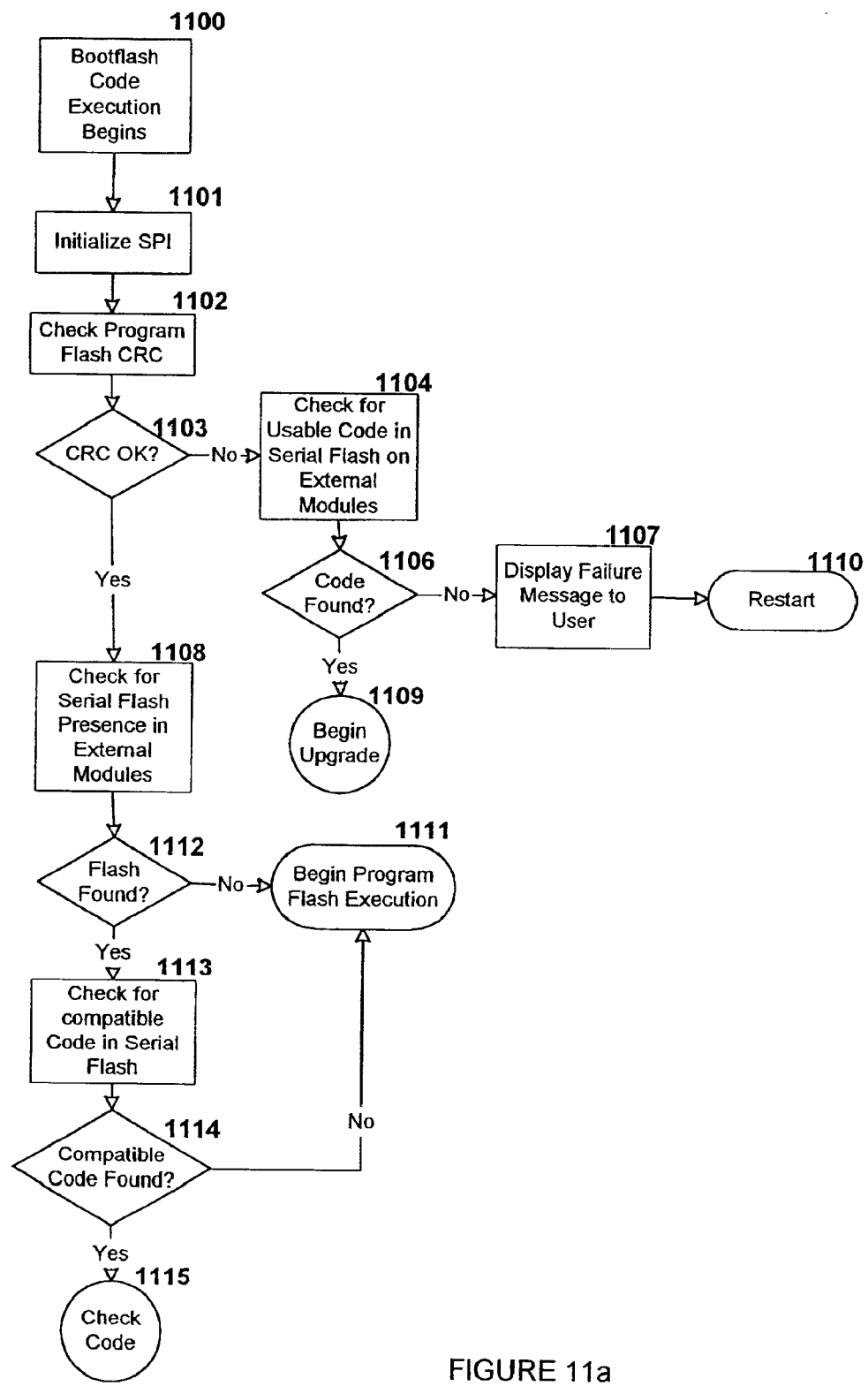
FIGS. 11A and 11B depicts a flow chart of the operation of the main processor of the present invention during startup.
Figure 11B:
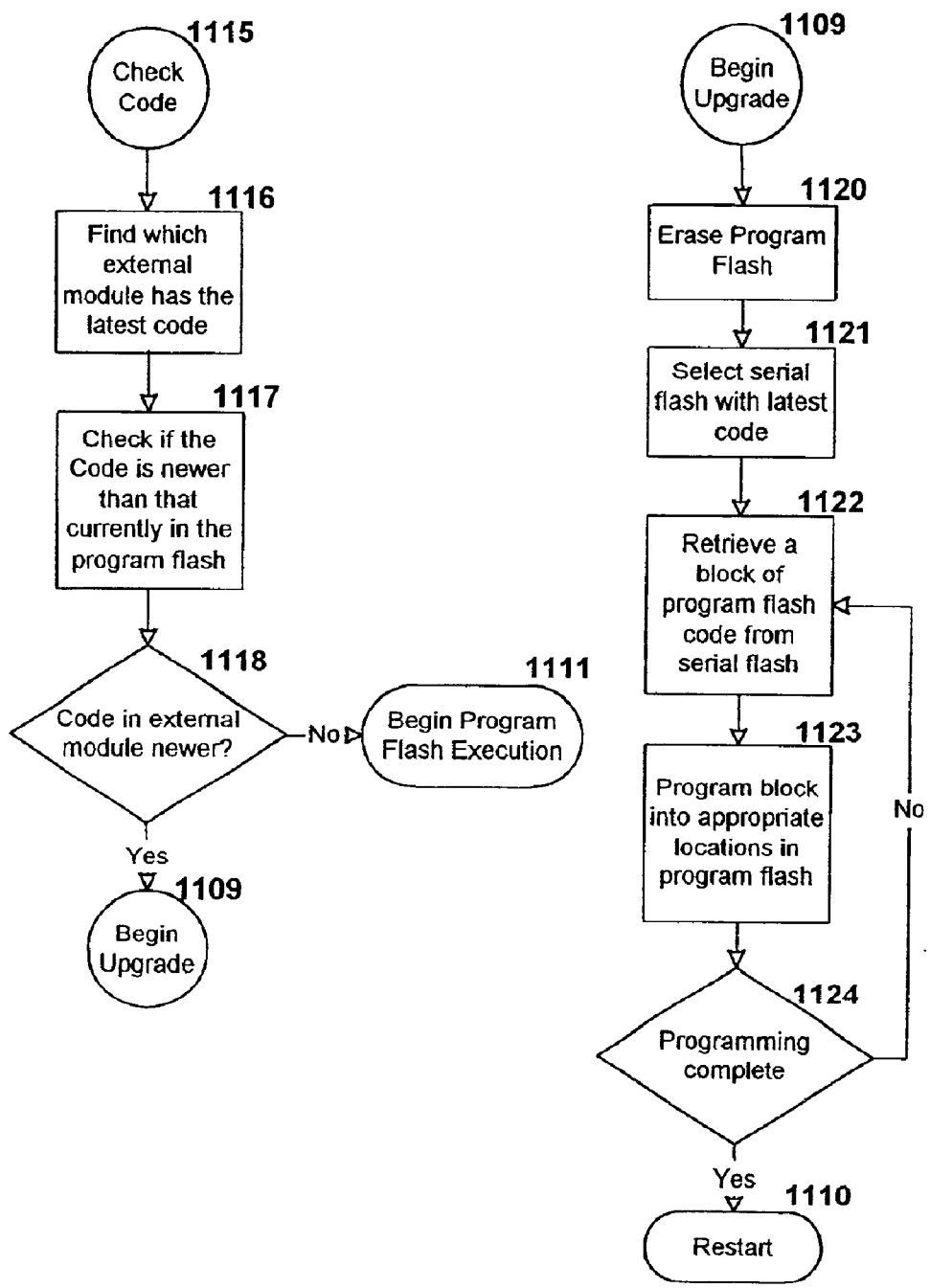

Referring now to FIGS. 11*a* and 11*b*, a flow chart of the execution of code on processor 906 during startup is shown. This code executes out of the boot flash memory 1925. It can be appreciated by those skilled in the art that additional code execution sequences, such as variable initialization and processor configuration, which are known in the art are required. These known additional code execution sequences have been omitted from the forthcoming description.

When power is first applied to the processor 906, it begins executing code 1100 from the boot flash memory 1925, the SPI port being initialized 1101 thereafter. The processor 906 then calculates 1102 a cyclic redundancy check (CRC) on the program flash memory 1915. The CRC determines whether the data in the program flash memory 1915 is valid or is corrupted in some way. If the CRC check 1103 passes, execution continues at block 1108 with the processor 906 checking the serial flash 1001 on any of the attached external function modules 810*a* 810*b* for valid code. Please note that the internal structure of an external function module 810*a* or 810*b* is the same with respect to FIG. 10, therefore whenever a component in external function module 810*a* is referred to, it may also refer to external function module 810*b*. At block 1112, the processor 906 checks for code in the serial flash 1001 and if the serial flash 1001 is found the processor 906 checks for compatible code in the serial flash 1113. If compatible code is found 1114, execution continues at block 1115. It is envisioned that the serial flash 1001 may contain multiple versions of code that are compatible with different versions of the device.

If the CRC check at block 1103 does not pass, execution continues at block 1104. In block 1104, the processor 906 checks the serial flash 1001 in any attached module 810*a*, 810*b* for code that is compatible with the device 100. If compatible code is found 1106, the processor 906 begins the upgrade process 1109 (described later). If compatible code is not found, a message is displayed to the user 1107 and the processor restarts 1110.

If the serial flash 1001 is not found at block 1112 or compatible code is not found at block 1114, the processor 906 jumps to the program flash memory 1915 to begin normal device operation 1111.

Referring now to FIG. 11b, the code execution continues, block 1115. The processor 906 checks which of external function module 810a 810b has the latest compatible code version 1116. Note, that either of external function modules 810a 810b may not be present which means that at block 1116, the processor may only find one serial flash 1001. At block 1117, the processor 906 checks to see if the code in the serial flash 1001 is newer than the code that is currently in the program flash memory 1915 of the processor 906. If the code in the serial flash 1001 is newer, block 1118, the upgrade process begins 1109. If not, the processor jumps to the program flash memory 1915 to begin normal device operation 1111.

At block 1109 the upgrade of the internal program flash memory 1915 of processor 906 begins. First, the program flash memory 1915 is erased 1120, then the processor selects the serial flash 1001 in external function modules 810a 810b that has the latest compatible code 1121. The processor 906 then begins a loop through blocks 1122, 1123 and 1124 where it loads a block of code from the serial flash 1001 into its internal RAM 1950. Then it programs this block of code into its internal program flash memory 1915 in the appropriate locations. This process continues until the program flash memory 1915 has been completely programmed at which time the processor restarts 1110. The restart process will take program execution back to block 1100 and after the CRC has been checked, program execution will eventually end up at block 1111 with the main program code being executed.

It will be noted by those skilled in the art that because the serial flash 1001 can contain code for more than one version of the base 101, external function modules 810a 810b can be used with more than one version of base 101. These different versions of base 101 may include versions without a display, versions that perform only the display function, versions that perform different functionality and versions manufactured for more than one OEM.

It will also be appreciated that the foregoing mechanism for programming the program flash memory 1915 within the processor 906 can be used in a manufacturing environment. External programming means for the processor 906 typically include device programmers which require the processor to be inserted into a device before being installed into the device 100 or in circuit programmers that connect to the device after it is installed. Device programmers require an extra manufacturing step and in circuit programmers are typically fairly slow. Therefore, in the preferred embodiment, the in circuit programmer is used to program the boot flash memory 1925 and the upgrade process, described previously, programs the program flash memory 1915. This speeds up the programming process because when the processor 906 is completely in control of the programming process there is no dependence on external communications interfaces and external processors.

II. Display

Figure 12:
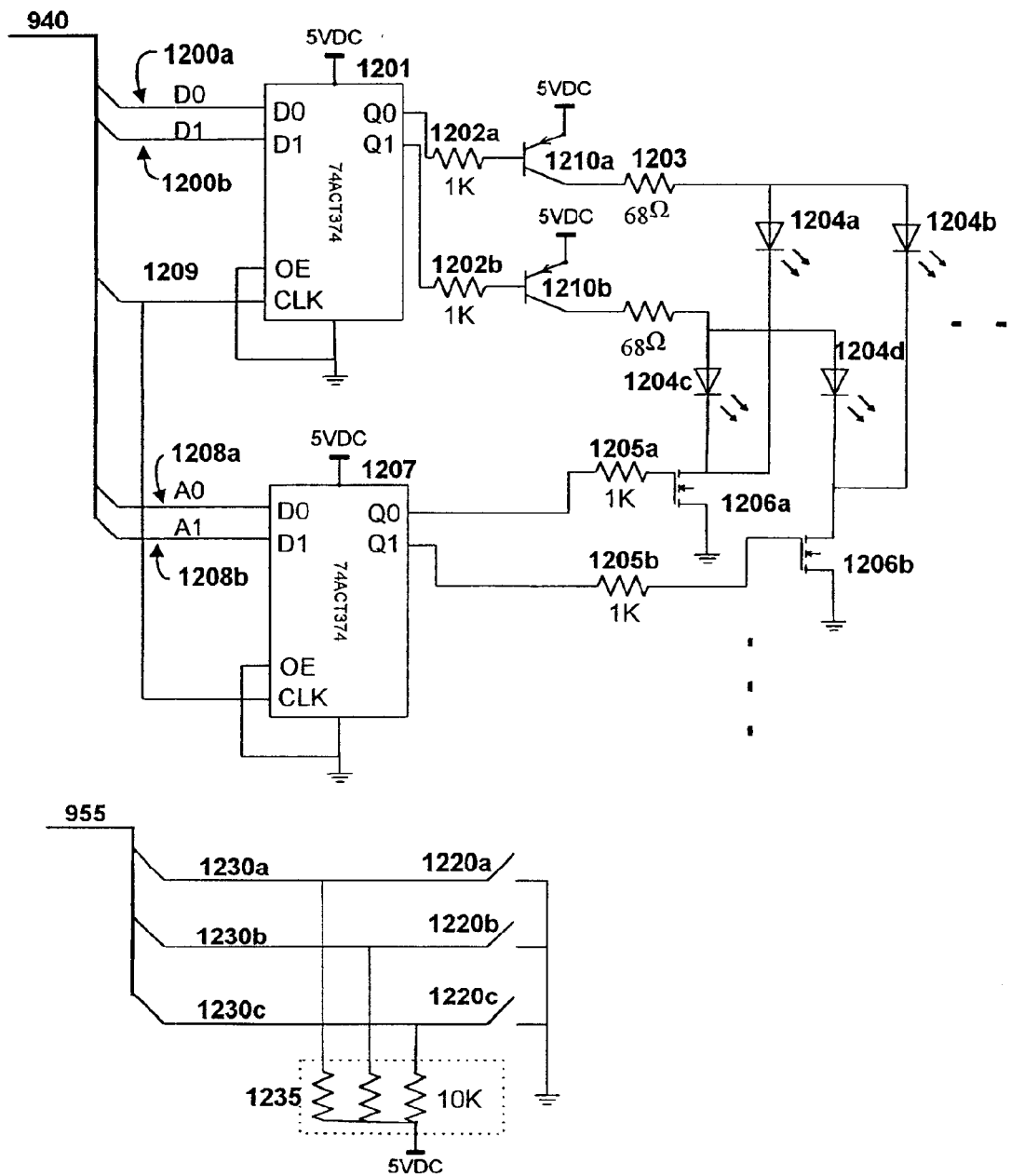
FIG. 12 depicts a schematic diagram of the display circuitry of the present invention.

Referring now to FIG. 12, the display circuitry of the preferred embodiment is shown. The display consists of a matrix of 16×8 LED's (light emitting diodes) which are arranged in such a way as to make the display of numbers, letters and indicators possible. The term LED includes discrete LEDs and LEDs that are part of a display. Note, that, for clarity, FIG. 12 only shows a 2×2 portion (1204a–1204d) of this array, however, expansion of the circuit to control a 16×8 matrix or larger will be apparent.

In order to light a particular LED or LED's on the display, the processor writes certain data at a particular address to the address/data bus 940. This write causes a transition on /WR line 1209 of the processor which clocks the data on the address/data bus 940 into the flip-flops 1201 1207. The data lines from the processor are used to control the row selection for the LED matrix while the address lines are used to control the column selection for the LED matrix. In this way, by manipulating the address and data interface lines, the processor may directly control each individual visual element in the display matrix. For instance, in order for the processor to light only LED 1204b, it would write with data line 1200a low, data line 1200b high, address line 1208a low and address line 1208b high. These logic states transfer from the Dx input of flip-flops 1201 and 1207 to the Qx outputs in response to an edge on /WR line 1209 turning transistors 1210a on, 1210b off, 1206a off and 1206b on. This causes current to flow from the 5VDC line through transistor 1210a, through resistor 1203, through LED 1204b and through transistor 1206b to ground. It will be noted to those skilled in the art that writing different combinations of high and low states to the address/data bus 940 will allow the lighting of various combinations of the LED's 1204a–d for the purpose of communicating human comprehendible messages. Exemplary transistors 1210a and 1210b include model MMBT4403LT1 manufactured by On Semiconductor, located in Phoenix Ariz. Transistors 1206a and 1206b include the MGSF1N02ELT1 manufactured by the same manufacturer. Flip-flops 1201 1207 are preferably model MC74ACT374DWR manufactured by the same manufacturer.

It is not desirable to turn on both transistor 1206a and 1206b at the same time while either of transistors 1210a and 1210b are on. This is because, for example, the current flowing through the transistor 1210a will split unevenly through LED's 1204a and 1204b due to the differing voltage drops across LED's 1204a and 1204b. Therefore, it is desirable for the processor 906 to "scan" over the display matrix by turning on each of the transistors 1206 in turn with a particular pattern on transistors 1210. This is done such that the each of the transistors 1206 in the 16×8 array is turned on at a frequency which gives the visual illusion that the LED is continuously lighted to the observer. In one embodiment, the LED is turned on for approximately 208 micro-sec ("usec") at a time, although longer or shorter time periods may be used which still achieves the desired visual illusion. Because the matrix is scanned through so quickly, the user does not notice that the LED's are not turned on continuously. This does however reduce the apparent brightness.

It will be thus noted by those skilled in the art that it is possible to make any combination of LED's in the 16×8 array appear to the user to be lit.

In another preferred embodiment, the processor 906 communicates through CAN pins 913 through CAN transceiver 933 to an external display 914. The external display also contains a processor that interfaces to display circuitry in the same manner as described above. Thus, to the user, the display on external display 914 appears identical to the display created by display circuitry 916. CAN communication involves the use of packets that contain identifiers. These identifiers identify the type of information that is contained in the packet. Any device on the CAN network can accept a packet with a given identifier. It will be appreciated therefore that a plurality of external displays 916 could be connected to the CAN transceiver 933 with no change in the number and type of packets transmitted by the processor 906.

The user can interact with the device 100 through buttons 1220a 1220b 1220c. Lines 1230a 1230b 1230c are pulled high by resistors 1235. When a user presses a button 1220, the state of the corresponding line 1230 transitions from high to low. This signal is fed back to processor 906 through button bus 955.

It will be noted by those skilled in the art that if the processor 906 had enough available general purpose I/O pins with enough current driving capability, it would not be necessary to interface through flip-flops 1201 1207. In this case, processor 906 would then be capable of driving the display matrix directly.

In addition, if flip-flops 1201 1207 had enough drive capability, it would not be necessary to populate resistors 1202a 1202b 1205a 1205b or transistors 1210a 1210b 1206a 1206b or combinations thereof. The combinations would depend on the actual drive capability of the flip-flops 1201 1207.

III. Display/Temperature Compensation

Referring again to FIG. 9, as described previously, A/D input 4 908 of the processor 906 receives a signal indicative of the temperature of the device. The temperature of the device 100 is a function of the ambient temperature of the device and the amount of heat generated inside the device 100. Because the accuracy of the analog circuitry 903 and the Analog to Digital Converters 905 are affected by temperature, it is desirable to keep the temperature within the device 100 as constant as possible.

The main heat generating components within the device 100 are the power supply 103 and the display circuitry 916. The display circuitry's heat generation is variable depending on how many LED's are lit and the amount of time they are lit for. The amount of power supply heat generation is mainly dependent on the amount of current it is supplying since it is a switching power supply. The number of LED's that are lit at one time is dependent on the data being displayed and therefore cannot be adjusted to control heat generation. Therefore, the best way to control the amount of heat generation in the device 100 is to control the time period that the LED's are lit for without causing the LED's to appear to flicker to the user, i.e. maintaining the illusion that the LED's are continuously lit.

In order to ensure that any particular LED on the display appears to the user to be "on", in the preferred embodiment, the LED is on for at least 208 us out of each 8.33 ms. The maximum amount of time that any one LED is lit for is 1.042 ms out of each 8.33 ms, i.e., there are 8 columns of 16 LED's and only LED(s) in one column can be illuminated at one time. There are five steps, for example, allowing the LED's to be turned on for 208, 417, 625, 833 or 1042 us, or, for example, any other convenient multiple of a periodic task of the processor. Thus, the display can be controlled to generate from ⅕ of its maximum to full power. The power used is preferably determined to maximize the brightness of the display, the accuracy and the temperature range of operation.

Figure 13:
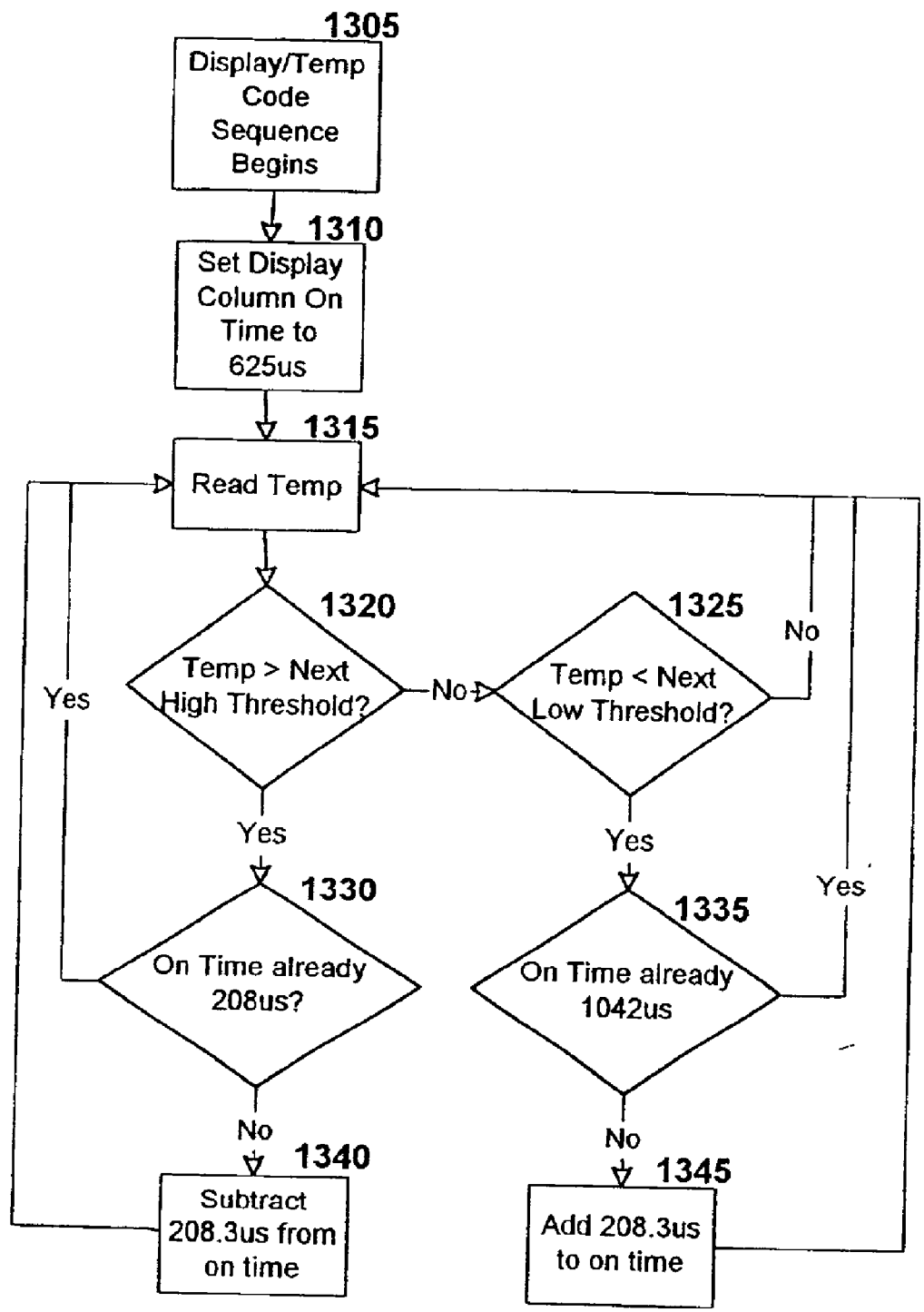
FIG. 13 depicts a flow chart of the display power dissipation compensation.

Nominally at room temperature, the display illuminates columns of LED's 625 us out of each 8.33 ms. If the processor detects through A/D input 908 that the temperature has decreased a certain amount it begins increasing the amount of power dissipated by the display by illuminating the columns for an increased amount of time. Conversely, if the processor detects an increase in temperature by a certain amount, it decreases the power dissipated by the display by illuminating the columns for a decreased amount of time. This process is ongoing during processor operation in order to keep the internal temperature of the device 100 as constant as possible. This process is illustrated in flow chart form in FIG. 13.

When the display temperature compensation code sequence begins 1305, the processor 906 illuminates the LED columns for 625 us out of each 8.33 ms 1310. Then, at block 1315 a periodic process begins wherein the a signal indicative of temperature is read through A/D input 4 908. If the temperature is greater than the threshold required to trigger a reduction in display power dissipation 1320, the current display on time is checked to see if it is already at the minimum 1330. If the on time is already at the minimum, execution continues with the next periodic reading of temperature 1315. If the on time is not at the minimum, 208.3 us is subtracted from the on time 1340 and execution continues with the next periodic reading of temperature 1315.

If at block 1320, the temperature is not greater than the next high threshold, a check is made to see if the temperature is below the next low threshold 1325. If it is, and the on time is not already set to the maximum 1335, 208.3 us is added to the on time 1345. Otherwise, execution continues with the next periodic reading of the temperature 1315.

The reduction is power consumption of the device at high temperatures has another benefit for devices such as the device 100. In order to have an electrical device approved by agencies such as Underwriters Laboratories ("UL") and Canadian Standards Association ("CSA"), it is necessary to meet the requirements of standards such as IEC61010-1. This standard requires tests that have defined limits for surface temperatures on various components within the system. These tests must be performed at the maximum ambient temperature of the device. It will be therefore appreciated that the ability of the processor 906 to reduce the power consumption of the display at high temperatures makes it possible to pass the requirements of such standards at higher specified maximum ambient temperatures.

IV. External Function Module Operation

An important feature of a device 100 is the capability of adding additional features to the functionality to the device without replacing the complete device. Basic functionality can be added to the device and activated using keys, however more complicated features that require more processing power or input/output capability than the basic device, can normally not be provided without replacing the complete device 100. By providing the capability to attach simple external function modules 810 that can be plugged into the base 101 unit, the required functionality can be added to the device without return to the factory or replacement.

Moreover, the functionality required at the time of sale and installation of the device 100 may not have been completely defined. This can come about since a user may change his mind after the device is installed, or the user must be provided with some new functionality/measurement parameters as set out in a standard that has been finalized after installation.

In one embodiment, a method is provided to add functionality to the device 100 through the use of external function modules 810. The functionality can be extended by either adding simple features in addition to the functionality already provided, or by completely replacing the original functionality with some new functionality. It also provides a means by which a defect, such as a software bug or hardware problem, in the original functionality of the device 100 can be overridden and fixed by the external function module 810.

One of the features of the external function module 810 must be the capability to not only take over and replace the internal software of the base 101 but to also take over some of the hardware within the base 101 to allow the external function module 810 to communicate over the input/output ports on the base 101. Such ports include serial ports such as RS-485 port 929, optical ports such as IR port 960 and solid state relay control ports (not shown).

Referring again to FIG. 10, the device base circuitry 901 communicates with the external function modules 810*a* 810*b* through the SPI bus 936. The SPI bus consists of three select lines 1005, 1010, 1020 and three communications lines 1025, 1030, 1035. The first two select lines 1005 1010 are used to select which of the external function modules 810*a* 810*b* the base circuitry 901 is communicating with. The third select line 1020 selects between the processor 1000 and the serial flash 1001 on the external function modules 810*a* 810*b*. Select lines 1005 1010 are reversed 1015 on the external function modules 810*a* 810*b* before being connected to connector 809 (FIG. 8) on each module. This has the affect of allowing the external function modules to be identical in structure since no matter what order external function modules 810*a* 810*b* are plugged onto the back of base 101, the processor 906 in base circuitry 901 can tell which module 810*a* 810*b* it is directing communication to.

The data sent from the base circuitry 901 is all the data that would be required to duplicate the functionality of the base 101 within the external function module 810. This includes:
Sample data—complete waveforms,
Intermediate calculated data,
Setup data, calculation modes and calibration constants,
Energy and other accumulators,
Final calculated data,
Button information,
Data received over the communication channels.

Sending this data provides two advantages: It allows the external function module 810 to simply use some sub-set of the data provided by the base 101 to augment the base 101 functionality. It also allows the base 101 functionality to be completely replaced by the external function module 810 if it becomes necessary to do so.

At the lowest level of operation, the device 100 samples multiple analog inputs from the analog circuitry 903 at a rate determined by the input frequency of the signal being measured. Typical frequencies include 50 and 60 Hz. The waveform is sampled 64 samples/cycle. In the present implementation, there are 6 input channels. Each sample is a 12 bit data value in the range of −2048 to +2048. To allow the external function module 810 to perform actions such as waveform capture and harmonic analysis, it is essential that the hard real time sample data is transmitted to the external function module 810. This data must be continuously transmitted. For each interval, a packet of data is transmitted that contains the data from the just completed sampling. At 60 Hz, the packet rate of transmission is 60 Hz*64=3840 packets/second. The data is transmitted at a clock rate of 2 MHz which typically allows 1.5 Mbits/sec throughput. Since the sample data is only a part of the total data that must be transmitted, the packet size is increased to accommodate the other information. The size of the packet is limited by the transmission data rate: the current packet must be finished before the next one can be sent. It is also limited by the maximum frequency that the device can support.

Figure 14:
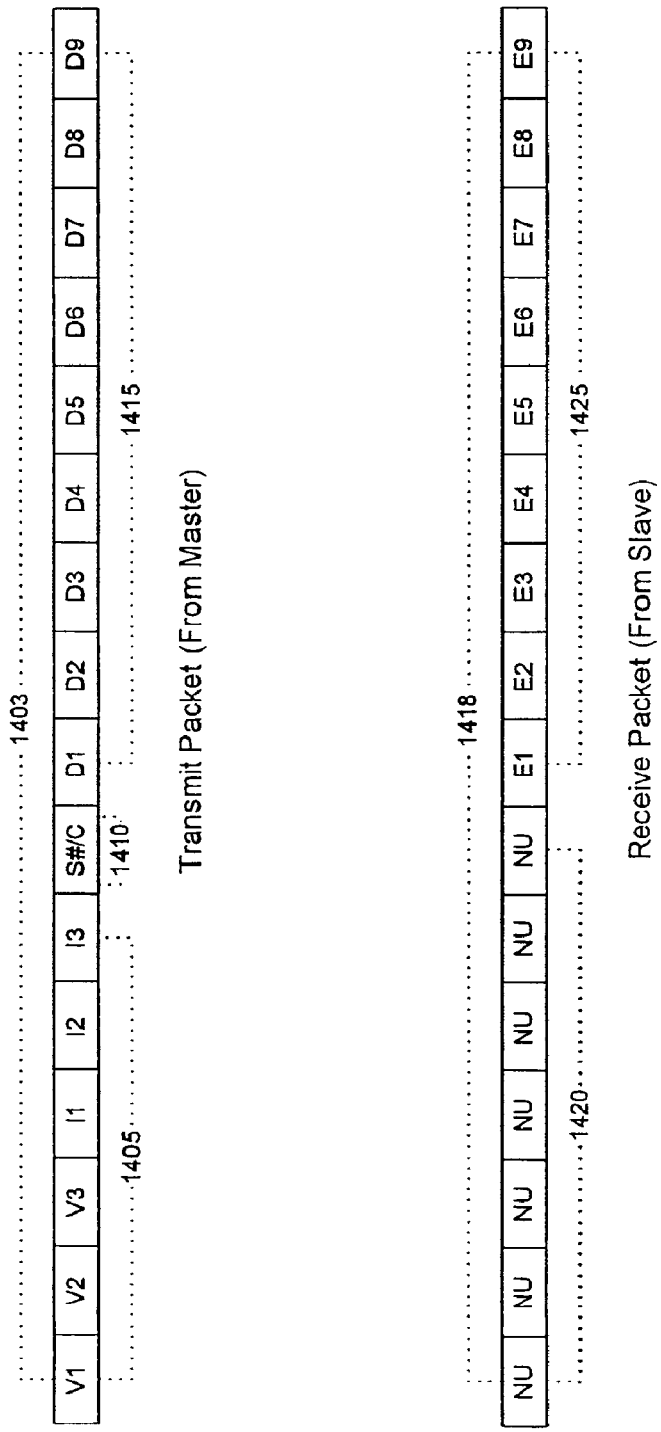
FIG. 14 depicts the packet structure of packets transmitted between the base and external function modules.

Referring now to FIG. 14, the structure of packets sent between processor 906 and processor 1000 is shown. The transmit packet 1403 consists of the A/D results 1405 for the three voltage and current inputs in analog circuitry 903, a sample number/checksum field 1410 and additional data words D1–D9 1415. The receive packet 1418 consists of 7 unused fields 1420 and additional data words E1–E9 1425. All words within the packets are 16 bits. The additional data words 1415 1425 provide communications for data that is not as time critical as the hard real-time data in 1405. The sample number/checksum field consists of a number indicating which sample number (from 0 to 63) this packet transaction is in the top 8 bits and a checksum of the packet in the bottom 8 bits. The sample number determines the content of the data words 1415 1425 as a particular type of sub-packet as described below.

Sub Packet Type 1 contains the intermediate data calculated on the raw data. This includes waveform calculations that calculate the sum, sum-of-squares, and cross products for voltage/current signals whose waveform was sampled. The last word in this data is the status of the base module calculations and the button status. Sub packet type 1 is transmitted in data words 1415 from the master processor 906 to the slave processor 1000.

Sub packet type 2 is used to transmit register information from and to the external function module 810. These registers are used to transfer information to and from the external function module 810 on a continuous basis. These registers are accessible through communications such as communications circuitry 929. Once a register on the processor 906 is written using a known protocol over communications circuitry 929, the data is automatically transferred to the external function module 810, and data sent from the external function module 810 is automatically transferred to the processor 906. The external function module 810 has complete control over the direction of transfer of data of the registers. Each external function module 810 register has a bit flag in the first two words transferred from the external function module 810. If this flag bit is a 1, the data moves from the external function module 810 to the processor 906, while if it is a 0, the data moves from the processor 206 to the external function module 810. Therefore, sub packet type 2 appears in both data words 1415 and 1425.

Sub packet type 3 is used to transfer screen data from the external function module 810. The first word in the data is used as a valid indication flag. If a screen is being transmitted by an external function module 810 in this cycle, then the first word contains 0, otherwise it contains 0xffff. If the processor 906 sees the first word as zero it will display the data received in the rest of the packet on the screen. Sub packet type 3 is transmitted in data words 1425 from the slave processor 21000 to the master processor 906.

Sub packet type 4 is used so that the external function module 810 can read or write memory on the processor 906. Sub packet type 4 is used to indicate whether the following sub packet type 5's are going to read or write to the memory of processor 906. Sub packet type 4 is transmitted in data words 1425 from the slave processor 1000 to the master processor 906.

Sub packet type 5 is used to transfer memory from and to the external function module 810. This memory transfer must be initiated by the external function module 810 by sending a read or write memory request command to the processor 906 in sub packet 4. The memory read and write commands are used on data that is not real time critical. It provides a completely generic, adaptable method of transferring information between the base 101 and the external function module 810*a* 810*b*. Access is provided to both the program memory 1900 and the data memory 1905. The program memory 1900 stores the program and usually some static information such as the location of various data structures in the memory. By reading the data structure locations from the program memory 1900, the external function modules 810 can automatically adapt to different statically linked memory maps. This is very important since otherwise all locations in the processor 906 code would have to be fixed, even for different releases of the software.

External function modules 810a 810b are selected using the select lines 1005 1010 provided in the interface between the base 101 and the external function module 810. During operation, the base module will continually transmit the data described above. When an external function module 810a 810b is plugged in it will start receiving all the data and at the same time start transmitting data only when its own select line 1005 1010 is active.

Figure 15:
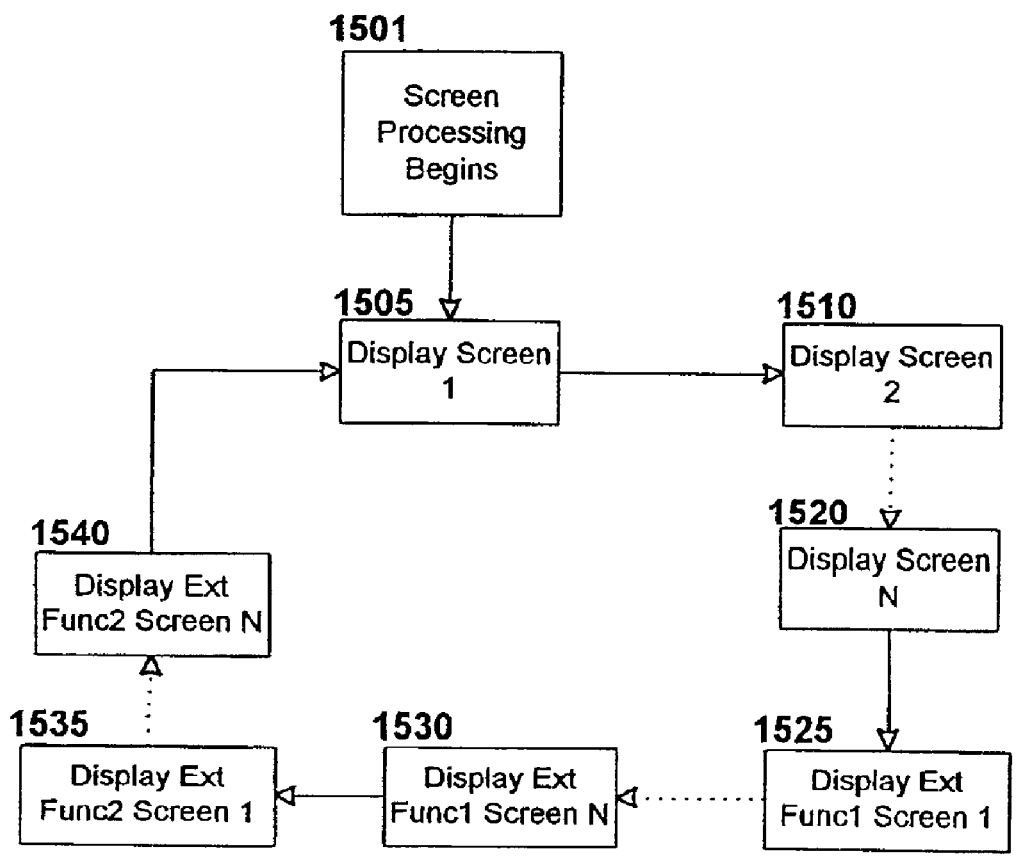
FIG. 15 depicts a flow chart of the operation of the screen creation code within the main processor.

Referring now to FIG. 15, the operation of the screen creation code within processor 906 is shown. The processor 906 cycles between the various displays based on a fixed time period or from user interaction. After code execution for screen processing begins 1501, the processor 906 displays the first screen 1505 using display circuitry 916. Then, the rest of the screens with information from the base 901 including 1510 and 1520 are displayed. At this point, in order to display the next screen 1525, the processor 206 sends a message to the external function module 810a requesting its first screen and waits. If a screen is received in 100 ms, the screen is shown. Execution continues displaying screens from external function module 810a until the last screen from this module 1530 is displayed. Then, the displays from external function module 810b are requested and displayed in the same fashion 1535 1540. Then processing continues from 1505 once again. Note, if no screen is retrieved from the external function module 810a 810b, no further requests are made of that module until the loop is cycled through again. This method allows the base 101 to control the user interface, but it also allows the external function modules 810a 810b to display as many screens as they have available. Some implementations of the external function modules 810a 810b will have no screens, others may have one, while still others may have more than one.

Figure 16:
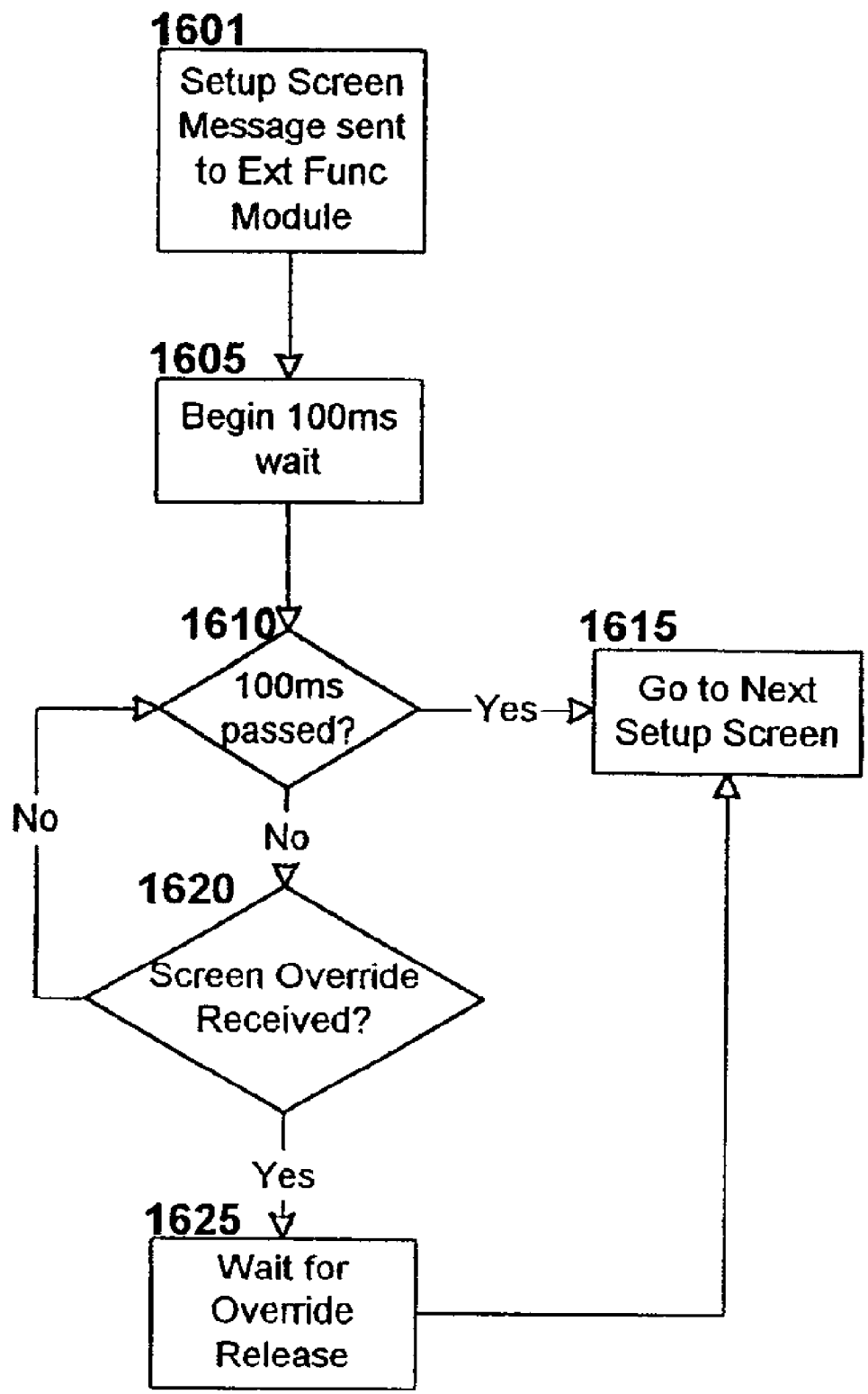
FIG. 16 depicts a flow chart of the operation of the setup screens for the external function modules.

Referring now to FIG. 16, the operation of the setup screens for external function modules 810 is shown. By pressing a certain combination of buttons 1220a 1220b 1220c, the user can enter setup mode. The transition from setup screen to setup screen proceeds in the same manner as the display screens shown in FIG. 15 except that when an external function module 810 setup screen is displayed, button interaction with the display code must be temporarily stopped such that the user can enter setup information directly into the external function module 810. When the processor 906 reaches the point where an external function module 810 setup screen is to be displayed 1601 it begins waiting for 100 ms 1605. If a screen override command is received 1620 during this time, it waits for the screen override to be released 1625. While the processor 906 is waiting for override release 1625, the external function module 810 can write in-directly through the processor 906 to the display circuitry 916 using the sub packet 4 and 5 described earlier. If 100 ms expires without receiving an override 1610, execution continues with the next setup screen 1615.

It will be noted that the screen override command can be used so that the external function module 810 can completely take over the display circuitry 916 of base 101 by overriding the display and never releasing it. In a similar fashion, the external function module 810 can take over other functionality of the base module by changing registers within the processor 906 such that the processor 906 does not drive the communications circuitry 929, infra red circuitry 960, etc.

It will be noted that instead of using base 101 display circuitry 916 for the foregoing discussion, the display circuitry in external display 914 could be used instead.

V. Calibration

Figure 17:
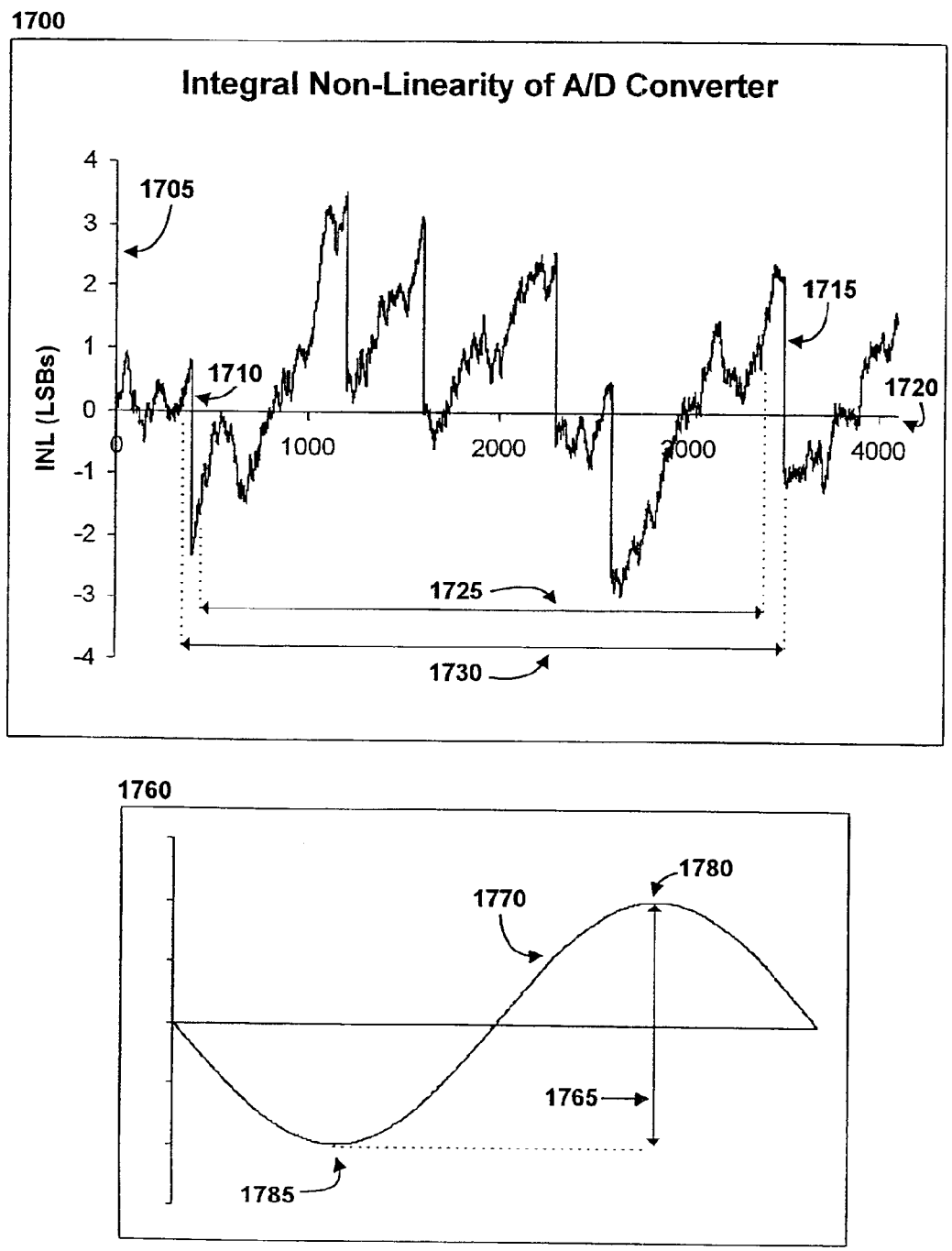
FIG. 17 depicts the integral non-linearity characteristic of the main processor of the present invention.

Referring now to FIG. 17, the integral non-linearity ("INL") 1700 characteristic of the A/D converters inside processor 906 is shown. The A/D is a 12 bit converter, but due to the fact that it is integrated onto the die of the processor and is manufactured in a 0.25 μm process, the integral non-linearity is quite poor compared to comparable external A/Ds. The INL 1700 is represented by a number of bits on the y-axis 1705. The A/D code is represented on the x-axis 1720.

The A/D converter has characteristic virtual discontinuities in its response such as those shown at 1710 and 1715. A graph of a typical signal generated by analog circuitry 903 and fed to the A/D converter is shown 1760. The signal is typically a sine wave 1770 with an amplitude 1765. The sine wave is typically centered around the mid-point of the A/D response, so the zero crossing of the sine wave when sampled will return an A/D code of approximately 2047. It will be noted that as the amplitude 1765 of the sine wave increases, it will span more and more A/D codes. For instance a first sine wave amplitude could span the range 1725 whereas a second sine wave amplitude could span the range 1730. When an rms calculation is performed on the sampled sine wave, a large percentage of the result is a result of a comparatively small number of samples at the peaks of the sine wave 1780 1785. Therefore, it will be obvious to those skilled in the art that as the amplitude of the sine wave 1765 transitions from spanning range 1725 to range 1730, there will be a non-linearity in the rms calculation.

Analog circuitry 903 causes magnitude and phase variation in the transformation of the relatively high voltage and current signals in the power system 902 to the low voltages required by the A/D inputs 905. This variation is a function of the amplitude and frequency of the incoming signals and of the non-linearity characteristics of the analog circuitry 903. For instance, the transformation of voltage may be phase shifted a comparatively smaller amount than the transformation of current.

Therefore, it is desirable to have a mechanism to compensate for the errors caused by both the A/D converter characteristics and the analog circuitry 903 characteristics. The present invention uses a multi-dimensional calibration compensation algorithm to compensate for errors in voltage, current and the phase relationship between voltage and current at more than one frequency. Previously, as described in U.S. Pat. No. 6,185,508, a multi-point calibration procedure was used that compensated only based on the magnitude of the signal. This meant that different versions of the device were necessary to support operation at different frequencies. The present invention compensates both for magnitude and frequency variation in the incoming signal.

Figure 18:
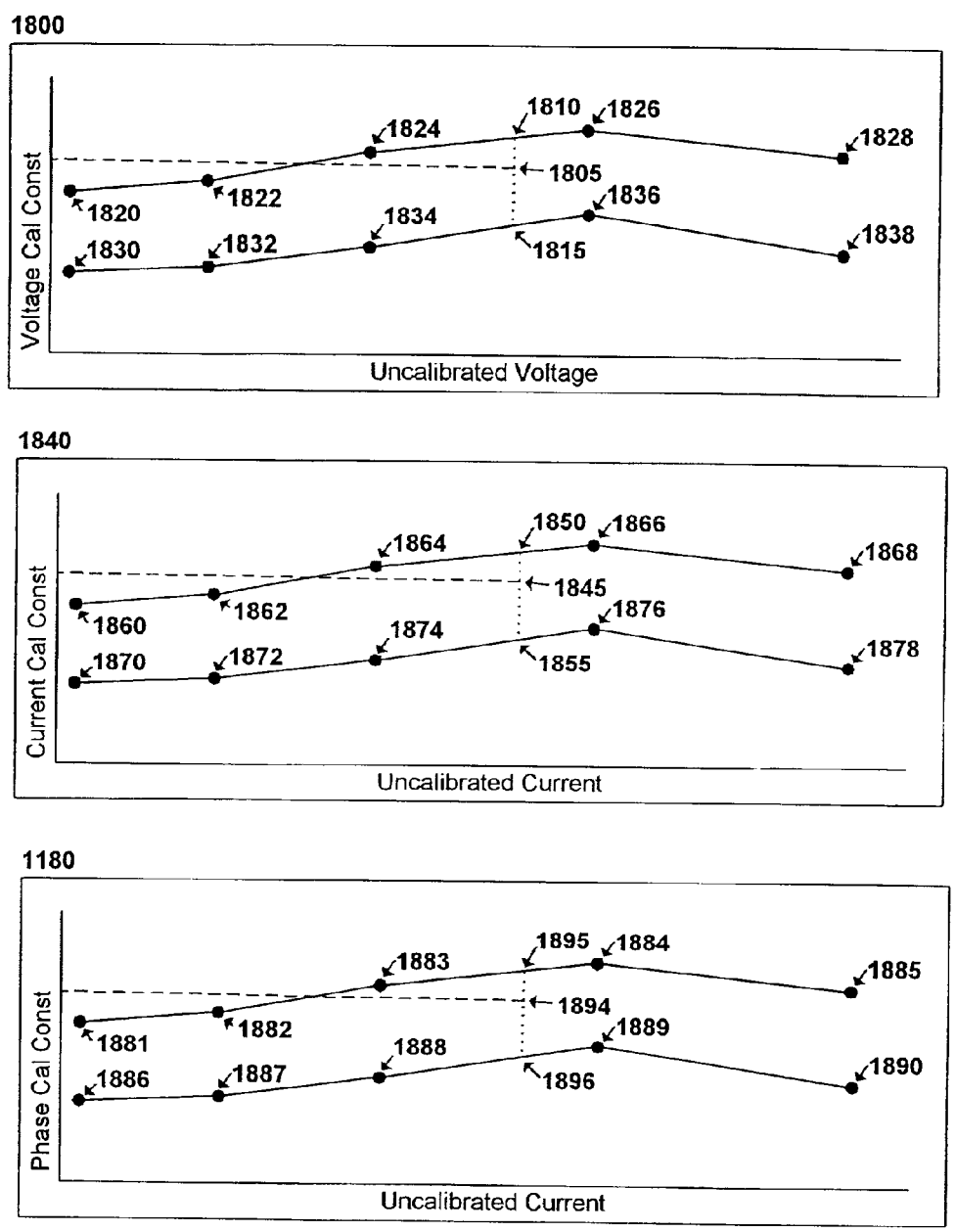
FIG. 18 depicts example calibration curves of the present invention.

Referring now to FIG. 18, graphs of the example calibration curves of the device 100 for voltage 1800, current 1840 and phase 1880 are shown.

There are ten calibration constants for each of the three voltage channels. Five of these are for one frequency (typically 50 Hz) and five for another frequency (typically 60 Hz). The calibration constants for 50 Hz are shown as points on the graph 1820 1822 1824 1826 1828. The calibration constants for 60 Hz are also shown as points on the graph 1830 1832 1834 1836 1838. The processor can find the appropriate calibration constant for any arbitrary uncalibrated voltage at an arbitrary frequency by using a two stage linear interpolation. Example calibration constants for points 1824 1826 1834 and 1836 are shown in table 1.

TABLE 1

| Point | Uncalibrated Voltage (Volts) | Calibration Constant |
|---|---|---|
| 1824 | 200 | 1.010 |
| 1826 | 300 | 1.015 |
| 1834 | 200 | 0.990 |
| 1836 | 300 | 0.996 |

In order to calculate the appropriate calibration constant for a given uncalibrated voltage at a given frequency such as point 1805 at 275V and 53 Hz, the following procedure is used:

1) Linearly interpolate the calibration constant between point 1824 and point 1826 using voltage to get a new intermediate calibration constant A at point 1810.

$$A = \frac{275 - 200}{300 - 200} * (1.015 - 1.010) + 1.010.$$

Therefore, A=1.01375.

2) Linearly interpolate between point 1834 and 1836 to get a new intermediate calibration constant B at point 1815.

$$B = \frac{275 - 200}{300 - 200} * (0.966 - 0.990) + 0.990.$$

Therefore, B=0.9945.

3) Linearly interpolate between point 1810 and 1815 using frequency to get the final calibration constant C at point 1805.

$$C = \frac{60 - 53}{60 - 50} * (A - B) + B.$$

Therefore, C=1.007975.

4) Multiply the uncalibrated voltage by C to get the calibrated voltage V. V=C*275. Therefore V=277.193125.

There are ten calibration constants for each of the three current channels. Five of these are for one frequency (typically 50 Hz) and five for another frequency (typically 60 Hz). The calibration constants for 50 Hz are shown as points on the graph 1860 1862 1864 1866 1868. The calibration constants for 60 Hz are also shown as points on the graph 1870 1872 1874 1876 1878. The processor can find the appropriate calibration constant for any arbitrary uncalibrated current at an arbitrary frequency by using a two stage linear interpolation. Example calibration constants for points 1864 1866 1874 and 1876 are shown in table 2.

TABLE 2

| Point | Uncalibrated Current (Amps) | Calibration Constant |
|---|---|---|
| 1864 | 3.00 | 1.010 |
| 1866 | 4.00 | 1.015 |
| 1874 | 3.00 | 0.990 |
| 1876 | 4.00 | 0.996 |

In order to calculate the appropriate calibration constant for a given uncalibrated current at a given frequency such as point 1845 at 3.7A and 53 Hz, the following procedure is used:

1) Linearly interpolate the calibration constant between point 1874 and point 1876 using current to get a new intermediate calibration constant A at point 1855.

$$A = \frac{3.7 - 3}{4 - 3} * (1.015 - 1.010) + 1.010.$$

Therefore, A=1.0135.

2) Linearly interpolate between point 1864 and 1866 to get a new intermediate calibration constant B at point 1850.

$$B = \frac{3.7 - 3}{4 - 3} * (0.996 - 0.990) + 0.990.$$

Therefore, B=0.9942.

3) Linearly interpolate between point 1850 and 1855 using frequency to get the final calibration constant C at point 1845.

$$C = \frac{60 - 53}{60 - 50} * (A - B) + B.$$

Therefore, C=1.00771.

4) Multiply the uncalibrated current by C to get the calibrated current I. I=C*3.7. Therefore I=3.728527.

There are ten calibration constants for phase (determined at different currents) to compensate for errors in phase caused by analog circuitry 903. Five of these are for one frequency (typically 50 Hz) and five for another frequency (typically 60 Hz). The calibration constants for 50 Hz are shown as points on the graph 1881 1882 1883 1884 1885. The calibration constants for 60 Hz are also shown as points on the graph 1886 1887 1888 1889 1890. The processor can find the appropriate phase calibration constant for any arbitrary uncalibrated current at an arbitrary frequency by using a two stage linear interpolation. Example calibration constants for points 1883 1884 1888 and 1889 are shown in table 3.

TABLE 3

| Point | Uncalibrated Currrent (Amps) | Calibration Constant (degrees) |
|---|---|---|
| 883 | 3.00 | 1.5 |
| 884 | 4.00 | 1.8 |
| 888 | 3.00 | 0.8 |
| 889 | 4.00 | 1.2 |

In order to calculate the appropriate phase calibration constant for a given uncalibrated current at a given frequency such as point 1894 at 3.7A and 53 Hz, the following procedure is used:

1) Linearly interpolate the calibration constant between point 1888 and point 1889 using current to get a new intermediate calibration constant A at point 1896.

$$A = \frac{3.7 - 3}{4 - 3} * (1.2 - 0.8) + 0.8.$$

Therefore, A=1.08.

2) Linearly interpolate between point 1883 and 1884 to get a new intermediate calibration constant B at point 1895.

$$B = \frac{3.7 - 3}{4 - 3} * (1.8 - 1.5) + 1.5.$$

Therefore, B=1.71.

3) Linearly interpolate between point 1895 and 1896 using frequency to get the final calibration constant C at point 1894.

$$C = \frac{60-53}{60-50} * (B-A) + A.$$

Therefore, C=1.521.

4) This calibration constant C is then used in the calculation of Watts and Vars. For instance, $$\sin\phi = \frac{W_u}{VA},$$

where Wu is the uncalibrated Watts and VA are the volt-amps. Therefore, the Watts can be compensated for mathematically by re-arranging this equation using methods known in the art and adjusting φ by a factor of C. φ is often referred to as the phase relationship between voltage and current although this is only strictly true for pure sinusoidal waveforms.

It will be appreciated that amplitudes of phase, current and voltage outside the bounds of the calibration points 1820 1822 1824 1826 1828 1830 1832 1834 1836 1838 1860 1862 1864 1866 1868 1870 1872 1874 1876 1878 1881 1882 1883 1884 1885 1886 1887 1888 1889 1890 can also be calibrated using this procedure by extending (for instance) the line formed by 1810 1815 beyond the limits of lines between 1824 1826 and 1834 1836.

By using the forgoing procedure, the output values of voltage, current and power of the device 100 can be corrected for variation in the input frequency and amplitude/phase errors generated by analog circuitry 903. This allows a single version of device 100 to be manufactured that meets the requirements of various power systems. The power systems typically span voltages of 50 to 690V, currents from 0 to 6A and frequencies from 50 to 60 Hz, but this in no way limits the extent of the invention.

It will be obvious to those skilled in the art that although the preceding description uses linear interpolation, any other type of interpolation including spline, or higher order polynomial interpolation may be used dependent on the amount of processing power available. In addition, the preceding description uses 5 calibration points per frequency, but any convenient number of ports may be used dependent on the amount of processing power and memory available.

VI. Flash Management and Ride-Through

One of the most important features of a power/energy meter and/or power quality monitor is the capability of preserving (saving) the results of many important measurements in the absence of operating power. Flash memory or similar types of memory are typically used to save this data due to the fact that it is comparatively robust and inexpensive. One possible implementation using flash memory is described in U.S. patent application Ser. No. 09/370,317, which was also filed in Canada and published as Canadian Patent No. 2299043. This implementation uses a power supply that maintains device operation for the time period required to write data to flash and is also capable of signaling the processor with a digital signal indicating that the power has failed.

The present invention uses a processor 906 containing internal flash memories 1915 1925 1960 (FIG. 12) and a ride-through/power fail detection circuit all intimately coupled to the processor 906 which provides an analog signal that allows the processor to make the decision on when the power supply 103 is no longer providing power. Ride-through is a term indicating the ability of the processor 906 to continue to function for a time period when the power supply 103 is no longer providing power to the processor 906.

Referring once again to FIG. 9, the ride-through/power fail detection circuit is composed of items 925 924 922 921 923 920 917. Diode 925 prevents charge from leaking out of capacitor 924 when power rail 910 stops providing voltage. Capacitor 924 maintains a voltage input to Low Dropout Regulator ("LDO") 919 for a time period after the voltage 910 begins to drop. Resistors 922 and 923 divide the voltage on 5 volt line 910 in half such that it can be fed through the filter composed of resistor 921 and capacitor 920 and into A/D input 917. Ground 934 provides a ground path for all the circuitry of the device 100. Thus, by sampling A/D input 917, the processor 906 can tell that the voltage powering the device 100 is falling and trigger the saving of data to flash.

The data flash 1960 is divided into 16 blocks of 256 words each. Each block can be individually erased. Erasing is the most time consuming feature. It must be implemented to remove old data from the Flash memory and make room for the new data. The data in the Flash memory may not be overwritten—it must be erased first before the write operation is possible.

The access management firmware is an integral and very important part of the described mechanism. This code must be implement in a robust way with predictable and bounded execution time to guarantee completion of the desired operations during the time when the ride-through power is still available. The flash access code consists of the low level flash hardware driver, the data units management and the periodic save task. Additionally, there exists a power-down signal service routine, which is responsible for processing of the power down hardware signal produced by the power down detection circuit.

The low level flash hardware driver implements the flash programming algorithms in a robust way with predictable and bounded execution time. The algorithms and timing information is provided by the manufacturer of the flash memory device.

The high level flash access management code implements, as a minimum, the following features: data unit write, data unit read, data unit erase, recovery of the last uncorrupted data unit, support for multiple data units (at least the device setup data unit and the device data unit). These features also need to be implemented in a robust and predictable way with a bounded execution time.

The periodic save task is responsible for saving the device data to the flash memory and ensuring that there is always sufficient amount of erased flash memory blocks ready to accept data during power down event. The periodic save task uses services provided by the flash memory access code.

The processor 906 is a very cost effective solution since no external memories are necessary, hence the cost of hardware is minimal. However, the size of the available flash memory 1915 1925 1960 is small [e.g., 4K words for the boot flash 1925, approx 31.5K words for the program flash 1915 and 4K words for the data flash 1960] and not sufficient for implementation of any commercially available flash file system firmware packages. The required size and cost of the device prohibit use of any commercially available backup power sources, such as batteries. Besides, presence of a battery is not desirable, since it requires monitoring of energy level and in-the-field servicing/replacement. Due to limited size of flash and the relatively small amount of relevant data, the size of a flash data unit is limited to a maximum of one flash block. To conserve code space, the size of the flash data unit is static, i.e. determined at the time of compilation and not allowed to change during run time, and the preferred embodiment implementation assigns data unit sizes and locations statically at compile time. They are not changed during run time. The following data units are set up: factory setup data unit, user setup data unit, non-volatile data unit, and diagnostic log data unit. Further, to save code space, the preferred embodiment imposes the following limitations on the data units: the size of the data unit must be between 1 and 224 words (word=16-bits), although each data unit will take up at least one data sector. The data sector size may be 8, 16 or 32 words.

The flash memory available on the processor chip is divided into code flash memory 1915 1925 and data flash memory 1960. The code is stored in and executed directly from the code flash memory 1915 1925. The data retention in the absence of power relies on the data flash memory 1960. During normal operation (i.e. with stable power) the device 100 maintains data in the RAM memory 1920 1950 and the periodic save task is responsible for copying of the relevant data to the data flash memory 1960 and erasing the flash memory blocks. The erasing is done in such a way that at any time there is at least one full flash block available for the power down data save and there is always at least one uncorrupted, previously saved, copy of the data unit in the data flash memory 1960. When the periodic data save task is saving a data unit other than the power down data unit, first the power down data unit is saved (before the other data unit). The periodic data saving asserts a semaphore (flag) to inform the power down service routine that the data saving is in progress. Should a power down occur during the periodic data saving, the power down service routine would detect this by means of the semaphore (flag) and not initiate another data save operation.

The power failure detection circuit 922 923 921 920 feeds a hardware signal into the analog-to-digital converter input 217 on the processor 917. The power supply of the device 103 produces 5VDC, which is regulated down to 3.3VDC by the LDO 919. The power down detection is achieved by dividing down 922 923 and low pass filtering 920 921 the 5VDC before it is regulated to 3.3VDC. The analog to digital converter performs a/d conversions and automatic limit check on the signal level. Once the signal level falls below the pre-programmed low limit, the A/D module generates a power failure event interrupt. This interrupt is serviced by the interrupt service routine, which then takes control of the processor, suspends all activities including the periodic data saving task, checks the periodic data save semaphore (flag) and, if the flag is not asserted, initiates a power failure data saving to the flash data memory 1960.

The ride-through circuit 924 925 provides the power necessary to program a limited amount of data into the data flash memory 1960. This circuit consists of an energy storage capacitor 924 and a diode 925 blocking any current flow from the energy storage capacitor 924 to any other parts of the circuit except for the processor 906 and related circuitry.

Referring to FIG. 203, the data unit information 2000 2050 stored in data flash and program flash is shown. The first 32 (16-bit) words in every flash block contain the flash block data unit descriptor sector (structure) with the following information (FIG. 13): page flags 2005 (status of a flash block): ERASED, LATEST, BACKUP, DISCARD, data unit number 2010 (which data unit occupies the flash block), data unit size in words 2015, data unit size in sectors 2020 (size of the data unit saved in this flash block), data unit checksum 2025 (CRC-16 performed on the saved data unit), and the "old copy" designator 2035 which indicates whether this data unit contains the most recent copy of the data 2040 or not. Additionally, there exists a constant table/array of structures which is indexed by data unit number 2010 and contains attributes of every data unit: data buffer address 2055 in RAM memory 1950, data buffer size 2060 in RAM memory 1950, checksum enable flag 2065, save counter enable flag 2070, data unit sector size 2075, number of sectors per flash block 2080, checksum offset 2085 (if any—checksum is not supported for the SMALL sector size), save counter offset 2090 (if any—save counter not supported for small sector size). This organization of data unit descriptors attempts to allocate static data unit attributes in the code space and dynamic data unit attributes in the data space in order to conserve limited RAM memory 1950 space and flash data memory space 1960 1915 1925.

The flash data unit write routine (part of the memory access manager) saves the data in the data flash memory 1960 performing a CRC calculation in the process, if so designated by the static data unit attributes. The CRC value 2025 for the saved memory data unit is saved in the flash block data unit descriptor sector 2002. The memory access manager also saves information about the length 2015 2020 of the saved data unit in the same flash block data unit descriptor sector 2002. If designated by the static data unit attributes, the data unit write routine also increments and saves the data unit save counter 2030 in the block data unit (descriptor sector and marks the copy as "old" by writing to the "old copy" designator location 2035. Depending on the required functionality, either the save counter or the "old copy" designator may be used. One flash block may contain multiple copies of a data unit saved at different times. If during data unit save, the data is saved to an erased flash block (new block), once the data is written, this block is marked as LATEST, the previous LATEST is marked as BACKUP and the previous BACKUP is marked as DISCARD.

If the save counters 2030 are used, a designated block of the data flash memory 1960 is set aside and separated from the data unit save/restore operations. This block of flash memory is used to store copies of data unit save counters. In the preferred embodiment, only the non-volatile data unit is used with a save counter, which is also stored in this designated area. When a data unit save occurs in controlled fashion, i.e. under control of the memory access manager and forced by power failure signal or periodic save task, the save counter is incremented and saved in the block data unit descriptor and its copy is saved in this designated flash block. Should the firmware crash due to a run time error, code bug, external electromagnetic interference, failure of the power down detection circuit or failure of the ride-through circuit—the save counter in the block data unit descriptor sector 2002 will not match the save counter in this designated flash block. This mechanism allows the processor 906 to estimate the extent of data corruption and allows it to detect uncontrolled firmware resets.

Figure 21:
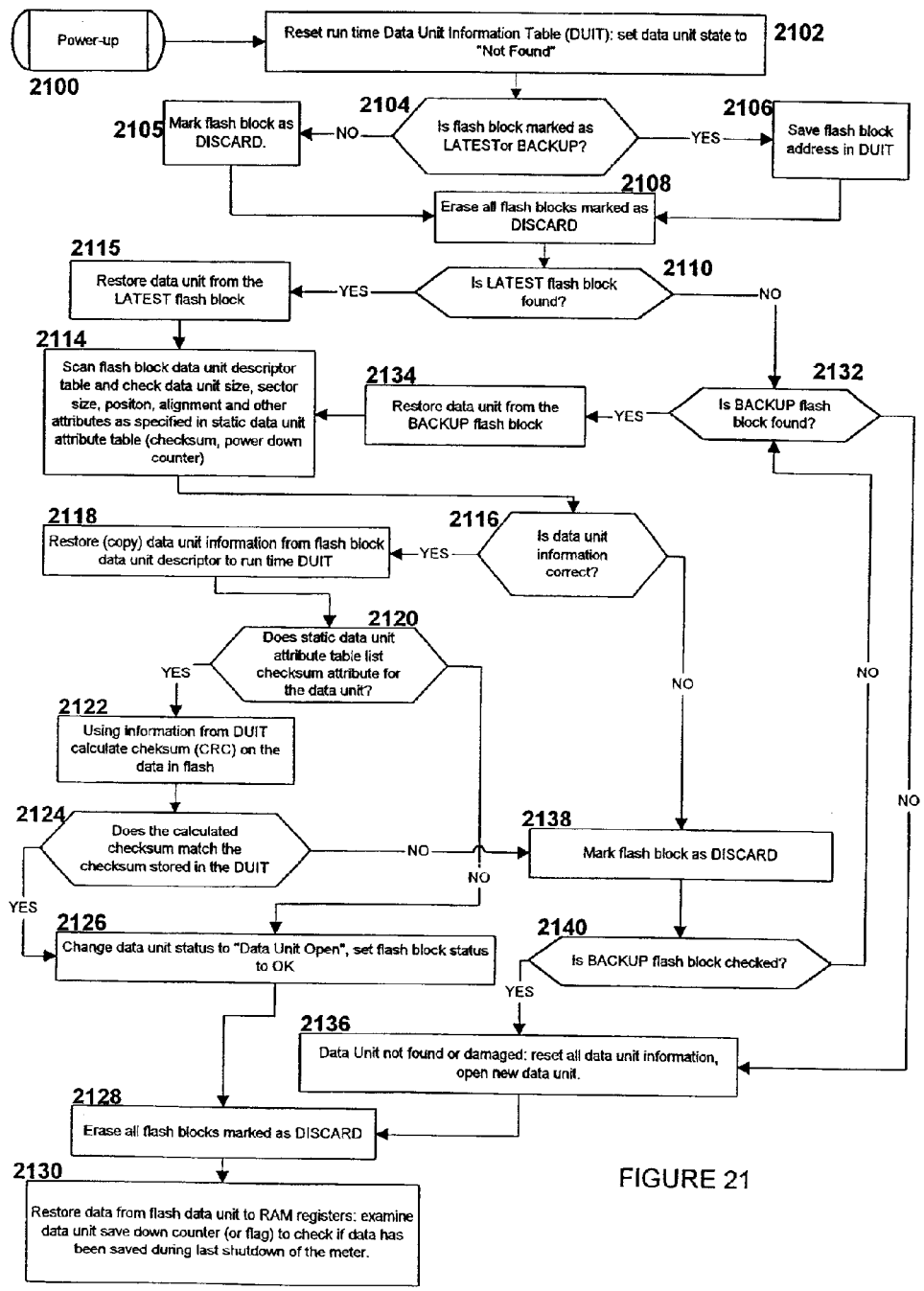
FIG. 21 depicts a flow chart the power up process for the flash memory management system of the present invention.

Referring now to FIG. 21, the power up process for the flash management system is shown. This process is executed on all blocks in the data flash memory 1960. After the device 100 powers up 2100, The data unit state in the Data Unit Information Table ("DUIT") in RAM 2150 is set to "Not Found" 2102. Then, a check is made to see if this flash block is marked LATEST or BACKUP 2104. If the block is the latest, its address is saved in the DUIT 2106, and all flash blocks marked as DISCARD are erased 2108. If the block is not marked LATEST or BACKUP at block 2104, the flash block is marked discard 2105 and execution continues at block 2108.

If the latest block was found 2110, the data unit is restored from the LATEST flash block 2115 and the flash block data unit descriptor table 2002 is scanned 2114. Then, if the data unit information is correct 2116, the data unit information 2040 is restored to the DUIT 2118. Then, if a checksum attribute 2025 is indicated in the data unit 2120, the CRC is calculated 2122 and checked against that stored in the DUIT 2124. If the CRC matches the data unit status is changed to "Data Unit Open" and the flash block status is set to "OK" 2126. Once again, all flash blocks marked as DISCARD are erased 2128 and the data 2040 is restored to RAM and the data unit is checked 2130 to ensure that it was saved during the last shutdown of the device 100.

If the latest block was not found at block 2110, a check is made for a backup flash block 2132. If a backup block was found 2134, execution continues at block 2114.

If a backup flash block was not found at block 2132, the data unit is lost and the data unit is opened as new 2136. Then execution continues at block 2128.

If at block 2116, the data unit information is incorrect, execution continues at block 2138 where the flash block is marked as DISCARD. If the BACKUP flash block has already been checked 2140, execution continues at block 2136. If not, execution continues at block 2132.

Figure 22:
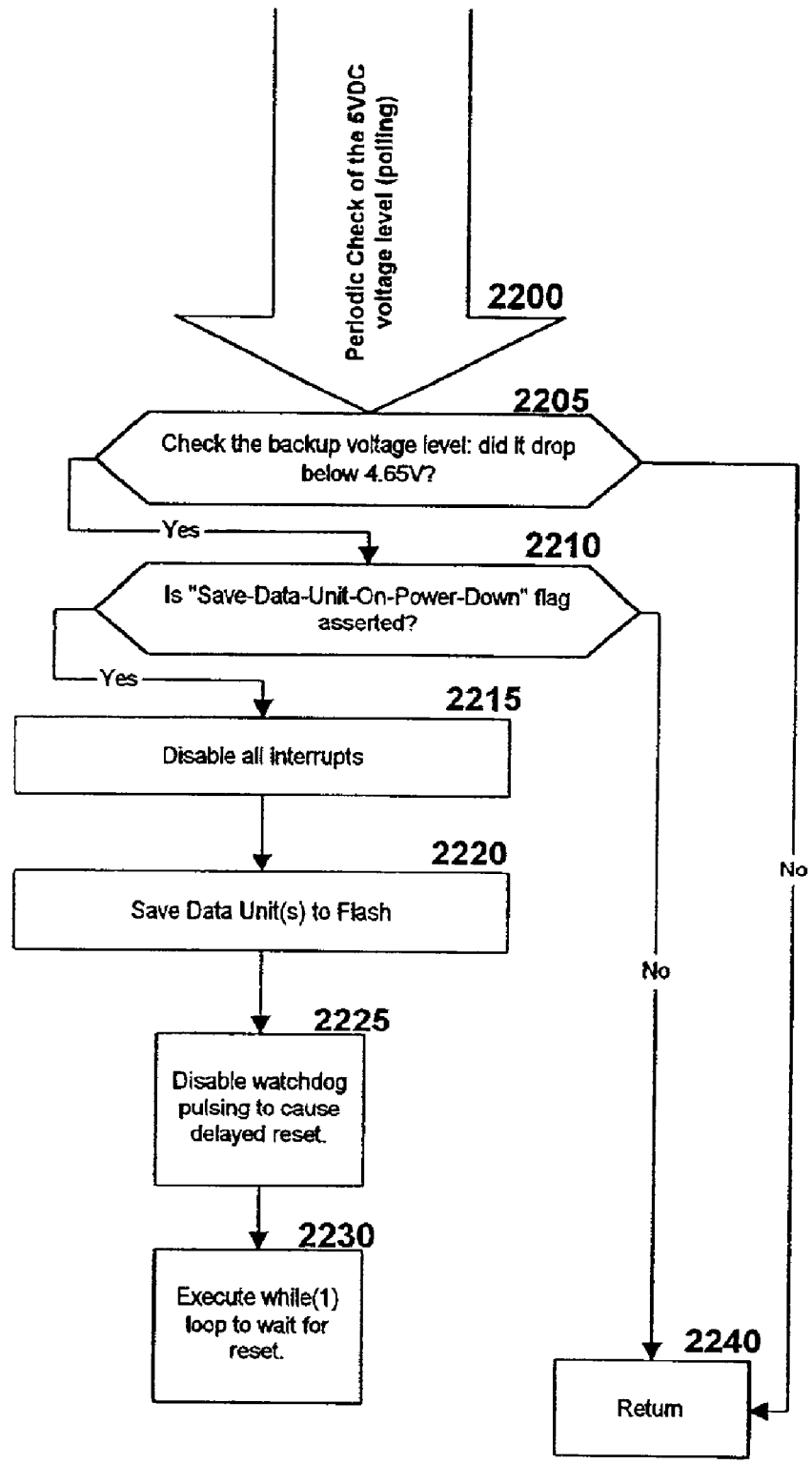
FIG. 22 depicts a flow chart of the periodic voltage level check of the present invention.

Referring now to FIG. 22, a flow chart of the periodic check of the voltage level on the 5 volt rail 910 is shown. When the polling interval comes due 2200, the A/D converter result is check to see if the voltage has dropped below 4.65V 2205. If the voltage has dropped, the "Save-Data-Unit-On-Power-Down" flag is checked 2210. If it is asserted, interrupts are disabled 2215, the data unit(s) are saved to flash 2220, strobing of watchdog of processor 906 is disabled 2225 and the processor goes into an infinite loop waiting for the watchdog to reset the processor 2230.

If at block 2205, the voltage has not dropped below 4.65V or if at block 2210, the flag is not asserted, code execution returns 2240.

Figure 23:
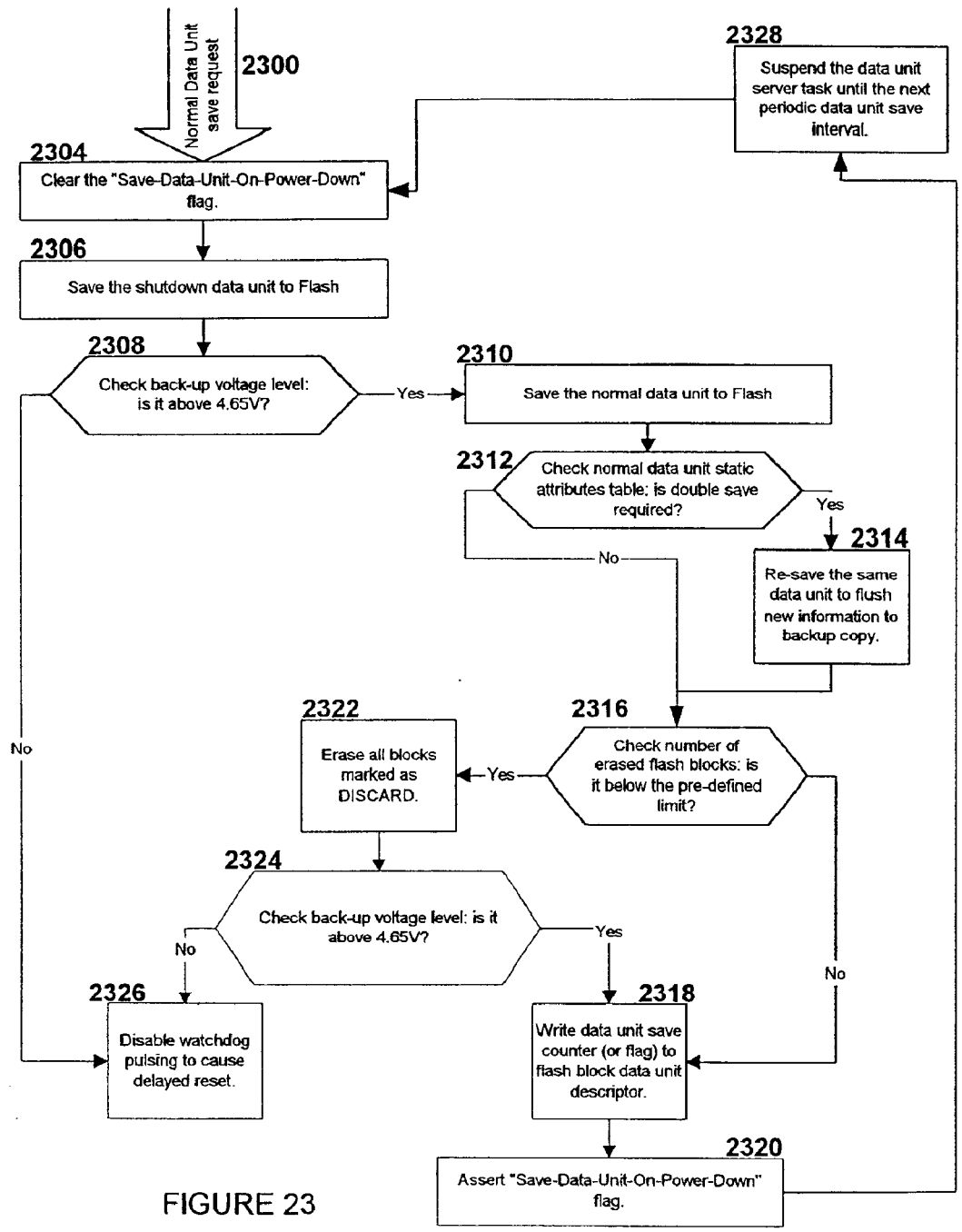
FIG. 23 depicts a flow chart of the data unit server task of the present invention.

Referring now to FIG. 23, a flow chart of the data unit server task is shown. During normal operation the processor 906 causes a periodic normal data unit save to happen once every 2 hours to ensure that in event of catastrophic failure causing a spurious processor reset, no more than this period worth of data will be lost. When a periodic normal data unit save request comes in 2300 the "Save-Data-Unit-On-Power-Down" flag is cleared 2304, then the shutdown data is saved to flash 2306. A check is then made to ensure the voltage is still being applied to the unit 2308. If the voltage is high enough, the normal data is saved to flash 2310. If the static attributes indicate that a double save is required 1612, the data is re-saved 2314 in order to flush the backup copy. Execution continues at block 2316 where the number of erased blocks is checked. If the number of erased blocks is not below the threshold the data unit save counter or flag is written to the flash block data unit descriptor 2318. Then, the "Save-Data-Unit-On-Power-Down" flag is re-asserted 1620 and the task is suspended until the next periodic request 2328.

If at block 2316 the number of erased blocks is below the threshold, all blocks marked as DISCARD are erased 2322. After the erase, the voltage level is once again checked to ensure it is above 4.65V 2324. If it is, execution continues at block 2318. If it is not, the watchdog strobing is stopped and the processor 906 waits for a watchdog reset 2326. Execution continues at block 2326 if the voltage is not high enough at block 2308 also.

It will be noted by those skilled in the art that the 4.65V threshold used can be replaced by other values depending on the particular application.

Figure 24:
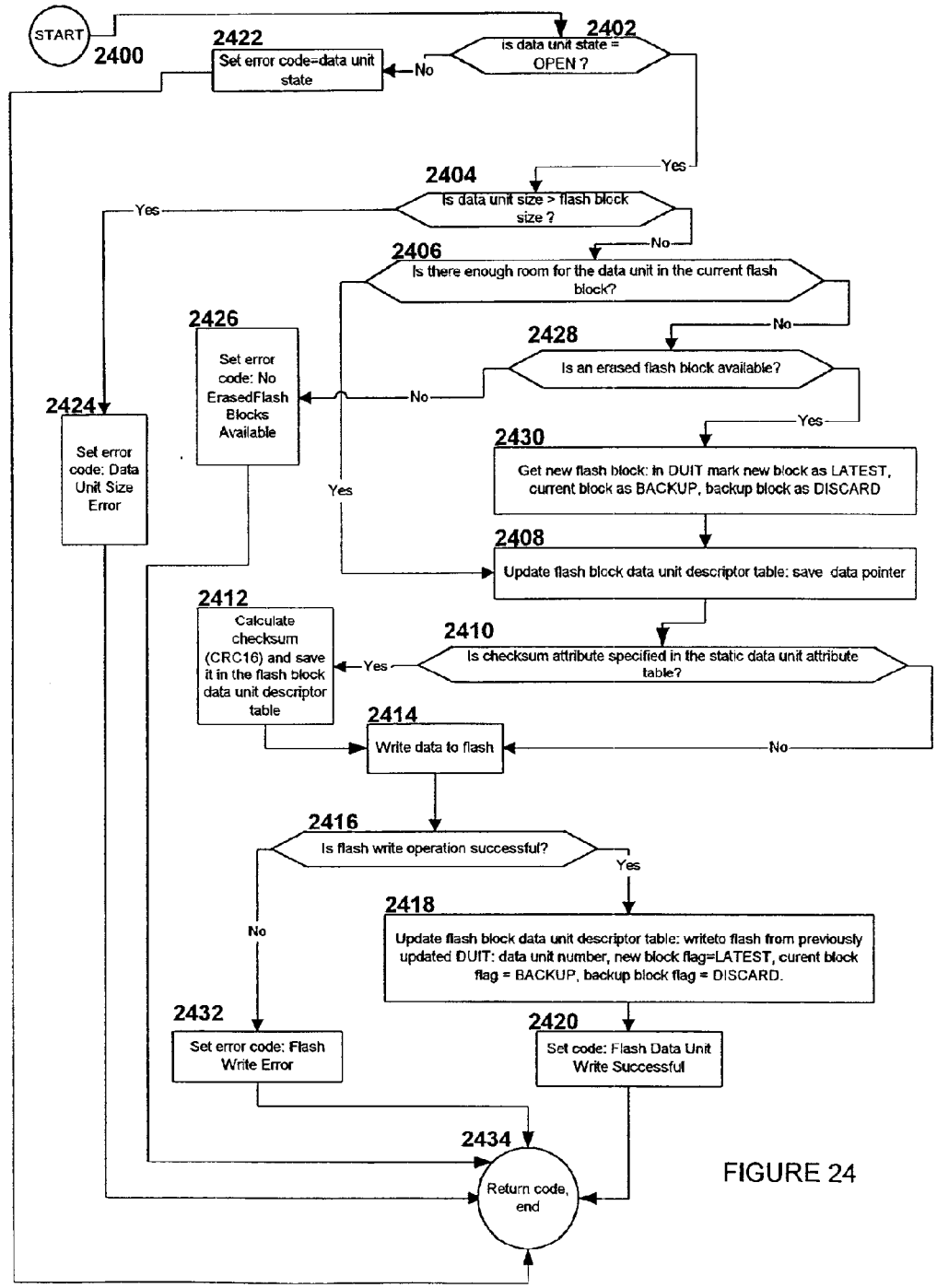
FIG. 24 depicts a flow chart of the flash write process of the present invention.

Referring now to FIG. 24 the flash write process is shown in flowchart form. At the start 2400 of a flash write, a check is made to see if the data unit's state is OPEN 2402. If the state is OPEN, the data unit size is checked against the flash block size 2404. If the data unit size is not bigger than the flash block size, a check is made to see whether the data unit will fit inside the current flash block 2406. If it will fit, the flash block data unit descriptor table is updated and the data pointer is saved 2408. Then, if the checksum attribute is set in the static data unit table 2410, the checksum (CRC) is calculated and saved in the flash block data unit descriptor table 2412. In either case, execution continues at block 2414 with the data being written to the flash. If the flash write is successful 2416 the flash block data unit descriptor table is updated 2418. Then, the a code is set indicating that the flash data unit write was successful 2420 and the code is returned 2434.

If at block 2404, the data unit size is greater than the flash block size, a code is set 2424 and the code is returned 2434.

If at block 2406, there is not enough room for the data unit in the current flash block, a check for an erased flash block is made 2428. If one is available, it is marked at LATEST, the current flash block is marked as BACKUP and the current backup block is marked as DISCARD 2430. Then execution continues at block 2408. If an erased block is not available at block 2428, an error code is generated 2426 and the code is returned 2434.

If at block 2416, the flash write operation is not successful, an error code is generated 2432 and the code is returned 2434.

The above flash storage mechanism could also be utilized by processor 300 in the external function module 810.

It will be clear to those skilled in the art that in the foregoing discussion, flash memory could be replaced with other types of non-volatile memory such as battery backed SRAM, ferro-electric RAM ("FRAM"), etc.

It will be clear to those skilled in the art that in the foregoing discussion, LEDs could be replaced with LCDs or any other emerging display technology with similar driving requirements.

It will be clear to those skilled in the art that in the foregoing discussion, the calibration mechanism could be used to compensate for other deficiencies in an analog to digital converter such as reduced resolution, missing codes, differential non-linearity, etc.

It will be clear to those skilled in the art that in the foregoing discussion, the flash upgrading procedure could be used to update flash memory that is not being used for program execution such as data tables, calibration constants, etc.

It will be clear to those skilled in the art that the external function modules of the foregoing discussion can provide many and varied functions such as Ethernet communications, modem communications, wireless communications, harmonics calculations, symmetrical components calculations, time of use calculations and recording, waveform recording, data recording, protective relaying, control, analog and digital inputs and outputs, etc.

It will be clear to those skilled in the art that the external function modules may contain at least one of a processor capable of performing additional functionality, additional circuitry for performing additional functionality and a flash memory that allows the main processor to upgrade its software, but need not contain all of these component parts.

It is therefore intended that the foregoing detailed description be regarded as illustrative rather than limiting, and that it be understood that it is the following claims, including all equivalents, that are intended to define the spirit and scope of this invention.

We claim:

1. An IED comprising:
   a base module, said base module including:
   a power monitoring circuit operative to monitor a parameter of a portion of a power distribution system and generate an analog signal representative thereof;
   a processor coupled with said power monitoring circuit, said processor comprising an analog to digital converter operative to convert said analog signal to a digital signal representative thereof, said processor operative to implement first power management functionality and generate first power management data;
   at least one of a display and a communications interface coupled with said processor and operative to communicate said first power management data external to said IED;
   a first interface coupled with said processor and said at least one of a display and a communications interface, said first interface operative to receive a first external function module, said first external function module comprising second power management functionality, wherein said first interface is further operative to facilitate implementation of said second power management functionality.

2. The IED of claim 1, wherein said first power management functionality comprises a first plurality of power management functions, said first interface being further operative to facilitate said second power management functionality to disable a first subset of said first plurality of power management functions.

3. The IED of claim 2, wherein said second power management functionality comprises a second plurality of power management functions, said first interface operative to facilitate substitution of said second subset for said first subset.

4. The IED of claim 1, wherein said first power management functionality comprises a plurality of power management functions, said first interface being further operative to facilitate said second power management functionality to utilize a subset of said plurality of power management functions.

5. The IED of claim 4, wherein said subset of said plurality of power management functions comprises a set of register outputs stored in a memory.

6. The IED of claim 5, wherein utilization of said set by said second power management functionality is not dependent upon a storage location of said set in said memory.

7. The IED of claim 1, wherein said first power management functionality comprises a plurality of power management functions, said first interface being further operative to facilitate said second power management functionality to supplement a subset of said plurality of power management functions.

8. The IED of claim 7, wherein said subset of said plurality of power management functions comprises a set of register outputs stored in a memory, said second power management functionality operative to add additional register outputs to said set.

9. The IED of claim 1, wherein said at least one of a display and a communications interface is capable of being utilized by said first external function module to communicate second power management data generated by said first external function module.

10. The IED of claim 9, wherein said second power management functionality implements a first communications protocol for use on said communication interface different from a second communications protocol implemented by said first power management functionality.

11. The IED of claim 9, wherein said second power management data comprises parameter and setup information for said first external function module.

12. The IED of claim 9, wherein said second power management data comprises results of computation performed by said first external function module based on said digital signal.

13. The IED of claim 1, wherein said communications interface comprises an RS-485 serial port.

14. The IED of claim 1, wherein said communications interface comprises an infrared port.

15. The IED of claim 1, wherein said communications interface comprises a network port.

16. The IED of claim 15, wherein said network comprises Ethernet.

17. The IED of claim 1, wherein said communications interface comprises an external device control port.

18. The IED of claim 1, wherein said interface communicates said digital signal to said first external function module.

19. The IED of claim 18, wherein said digital signal is communicated to said first external function module continuously in real time.

20. The IED of claim 19, wherein said digital signal comprises samples representative of at least one of voltage and current in said power distribution system.

21. The IED of claim 18, wherein said second power management functionality comprises computing kilowatts based on said digital signal.

22. The IED of claim 18, wherein said second power management functionality comprises computing harmonics based on said digital signal.

23. The IED of claim 18, wherein said second power management functionality comprises recording a waveform of said digital signal.

24. The IED of claim 18, wherein said second power management functionality comprises computing symmetrical components based on said digital signal.

25. The IED of claim 18, wherein said second power management functionality comprises recording data from said first power management functionality.

26. The IED of claim 1, wherein said first interface is capable of receiving said first external function module without uninstalling said IED.

27. The IED of claim 1, wherein said first interface is further operative to receive a plurality of said first external function modules, each of said plurality of first external function modules comprising a second interface, wherein a first of said plurality of first external function modules is coupled with said first interface and subsequent of said plurality of first external function modules are sequentially coupled with each other via said second interface and wherein said first interface communicates with each of said plurality of first external function modules as though each was connected with said first interface.

28. The IED of claim 1, wherein said first interface is further operative to communicate with a second external function module coupled with said first external function module through said first external function module.

29. The IED of claim 28, wherein a first connection of said second external function module to said first external function module and a second connection of said first external function module to said first interface uniquely identifies each of said first and second external function modules for subsequent individual communications by said interface based on said first and second connections.

30. The IED of claim 28, wherein said first external function module and said second external function module are operative to be physically coupled together.

31. The IED of claim 1, wherein said base module further comprises a first non-volatile memory operative to store first program code for execution by said processor, said processor being operative to access a second non-volatile memory in said first external function module via said first interface, said second non-volatile memory comprising second program code, said processor further operative to replace said first program code in said first non-volatile memory with said second program code.

32. The IED of claim 31, wherein said processor is further operative to check said second program code for compatibility with said base module prior to replacing said first program code.

33. The IED of claim 32, wherein said processor is further operative to check a version identifier of said second program code and only replace said first program code if said version identifier identifies said second program code as a later version than said first program code.

34. The IED of claim 31, wherein said processor is further operative to check a version identifier of said second program code and only replace said first program code if said version identifier identifies said second program code as a later version than said first program code.

35. The IED of claim 31, wherein said processor is further operative to select said second program code from a plurality of program code stored in said second non-volatile memory based on compatibility with said base module.

36. The IED of claim 31, wherein said processor is further operative to select a correct version of said second program code from a plurality of program code stored in said second non-volatile memory, each of said plurality of program code characterized by a different version.

37. The IED of claim 31, wherein said first non-volatile memory comprises a flash memory.

38. The IED of claim 31, wherein said second non-volatile memory comprises a flash memory.

39. The IED of claim 1, wherein said base module comprises a first enclosure and said first external functional module comprises a second enclosure outside said first enclosure; said first interface comprising a coupling between said base module and said external function module.

40. The IED of claim 39, wherein said first power management functionality comprises computing an rms voltage of said power distribution system using said digital signal.

41. The IED of claim 40, wherein said second power management functionality comprises recording a waveform of said digital signal in a memory within said first external function module.

42. The IED of claim 1, wherein said power monitoring circuit further comprises current inputs and voltage inputs.

43. The IED of claim 42, wherein said first power management functionality comprises computing an rms voltage of said power distribution system using said digital signal.

44. The IED of claim 43, wherein said second power management functionality comprises recording a waveform of said digital signal in a memory within said first external function module.

45. The IED of claim 1, wherein said first power management functionality comprises computing an rms voltage of said power distribution system using said digital signal.

46. The IED of claim 45, wherein said second power management functionality comprises recording a waveform of said digital signal in a memory within said first external function module.

47. The IED of claim 45, wherein said second power management functionality comprises communicating a signal indicative of said rms voltage over a second communications interface.

48. The IED of claim 47, wherein said second communications interface comprises Ethernet.

49. The IED of claim 45, wherein said second power management functionality comprises at least one of an analog input, and an analog output.

50. The IED of claim 45, wherein said second power management functionality comprises a data logging feature.

51. The IED of claim 45, wherein said first power management functionality further comprises computing watts flowing within said power distribution system using said digital signal.

52. A method of expanding functionality of an IED, said IED comprising a base module coupled with a portion of a power distribution system, said method comprising:
(a) monitoring a parameter of said portion;
(b) generating an analog signal representative of said parameter;
(c) converting said analog signal to a digital signal representative thereof;
(d) implementing first power management functionality on said digital signal;
(e) generating first power management data by said first power management functionality;
(f) communicating said first power management data externally of said IED via at least one of a display and a communications interface;
(g) receiving a first external function module by said base module, said first external function module comprising second power management functionality; and
(h) facilitating implementation of said second power management functionality.

53. The method of claim 52, wherein said first power management functionality comprises a first plurality of power management functions, said method further comprising:
(i) facilitating said second power management functionality to disable a first subset of said first plurality of power management functions.

54. The method of claim 53, wherein said second power management functionality comprises a second plurality of power management functions, said method further comprising:
(j) facilitating substitution of said second subset for said first subset.

55. The method of claim 52, wherein said first power management functionality comprises a first set of register outputs stored in a memory, said method further comprising:
(i) facilitating said second power management functionality to utilize a subset of said first set of register outputs independent of said register outputs' location in said memory.

56. The method of claim 52, further comprising:
(i) communicating said digital signal to said first external function module.

57. The method of claim 56, wherein (i) further comprises communicating said digital signal in real time.

58. The method of claim 57, wherein (i) further comprises communicating samples representative of at least one of voltage and current continuously in real time.

59. The method of claim 56, further comprising:

(j) computing a kilowatt value by said second power management functionality based on said digital signal.

60. The method of claim 56, further comprising:

(j) computing at least one harmonic by said second power management functionality based on said digital signal.

61. The method of claim 56, further comprising:

(j) recording a waveform by said second power management functionality based on said digital signal.

62. The method of claim 56, further comprising:

(j) computing at least one symmetrical component by said second power management functionality based on said digital signal.

63. The method of claim 52, further comprising:

(i) receiving, by said base module, said first external function module without uninstalling said IED.

64. The method of claim 52, further comprising:

(i) communicating with a second external function module coupled with said first external function module through said first external function module.

65. The method of claim 64, further comprising:

(j) identifying each of said first and second external function modules for subsequent individual communications with said base module based on a first connection of said second external function module to said first external function module and a second connection of said first external function module to said base module.

66. The method of claim 52, further comprising:

(i) storing first program code in a first non-volatile memory in said base module;

(j) accessing a second non-volatile memory in said first external function module, said second non-volatile memory comprising second program code; and (k) replacing said first program code in said first non-volatile memory with said second program code.

67. The method of claim 66, further comprising:

(l) checking a version identifier of said second program code; and wherein (k) further comprises replacing said first program code if said version identifier identifies said second program code as a later version than said first program code.

68. The method of claim 66, further comprising:

(l) selecting said second program code from a plurality of program code stored in said second non-volatile memory based on compatibility with said base module.

69. The method of claim 66, further comprising:

(l) selecting a correct version of said second program code from a plurality of program code stored in said second non-volatile memory, each of said plurality of program code characterized by a different version.

70. An IED comprising:

a power monitoring circuit operative to monitor a parameter of a portion of a power distribution system and generate an analog signal representative thereof;

an analog to digital converter coupled with said power monitoring circuit, said analog to digital converter operative to convert said analog signal to a digital signal representative thereof;

a processor coupled with said analog to digital converter and operative to implement first power management functionality and generate power management data;

at least one of a display and a communications interface coupled with said processor and operative to communicate said power management data external to said IED;

an interface coupled with said processor and operative to receive a power supply; and wherein said power supply supplies power to the IED and said power supply can be removed without uninstalling said IED; and said interface further operative to receive, said a first external function module comprising second power management functionality.

71. The power meter of claim 70 wherein uninstalling includes removing the voltage input connections from said IED.

72. The power meter of claim 70 wherein uninstalling includes removing the current input connections from said IED.

73. The power meter of claim 70 wherein uninstalling includes removing said IED from a panel.

74. The power meter of claim 73 wherein said panel is a switchgear panel.

* * * * *

US006871150C1

(12) EX PARTE REEXAMINATION CERTIFICATE (7699th)

United States Patent
Huber et al.

(10) Number: US 6,871,150 C1
(45) Certificate Issued: Aug. 24, 2010

(54) EXPANDABLE INTELLIGENT ELECTRONIC DEVICE

(75) Inventors: Benedikt T. Huber, Victoria (CA); Kurtulus H. Ozcetin, Sidney (CA); Hal E. Etheridge, Victoria (CA); Geoffrey T. Hyatt, Victoria (CA); Simon H. Lightbody, Victoria (CA); Piotr B. Przydatek, Victoria (CA)

(73) Assignee: Power Measurement, Ltd., Saanichton, British Columbia (CA)

Reexamination Request:
No. 90/009,006, Jan. 29, 2008

Reexamination Certificate for:
Patent No.: 6,871,150
Issued: Mar. 22, 2005
Appl. No.: 09/931,145
Filed: Aug. 15, 2001

Related U.S. Application Data

(63) Continuation-in-part of application No. 09/791,421, filed on Feb. 23, 2001, now Pat. No. 7,249,265.

(51) Int. Cl.
*G01D 4/00* (2006.01)
*G01R 22/00* (2006.01)
*G01R 21/133* (2006.01)
*G01R 21/00* (2006.01)
*H04L 9/32* (2006.01)

(52) U.S. Cl. .................................... 702/62; 700/291
(58) Field of Classification Search .................. None
See application file for complete search history.

(56) References Cited

U.S. PATENT DOCUMENTS

| 4,458,307 | A | 7/1984 | McAnlis et al. |
| 4,713,609 | A | 12/1987 | Losapio et al. |
| 5,528,507 | A | 6/1996 | McNamara et al. |
| 5,555,508 | A | 9/1996 | Munday et al. |
| 5,568,398 | A | 10/1996 | Trainor |
| 5,627,759 | A | 5/1997 | Bearden et al. |
| 5,680,324 | A | 10/1997 | Schweitzer et al. |
| 5,694,607 | A | 12/1997 | Dunstan et al. |
| 5,696,501 | A | 12/1997 | Ouellette et al. |
| 5,734,571 | A | 3/1998 | Pilz et al. |

(Continued)

FOREIGN PATENT DOCUMENTS

WO    WO 98/54583    12/1998

OTHER PUBLICATIONS

Computer Dictionary "The Comprehensive Standard for Business, School, Library and Home", 1994, Microsoft Press, Second Edition, p. 218.*
ABB Alpha Solid State Polyphase Meter, Product Bulletin 42–270–B, Sep. 15, 1995.

(Continued)

*Primary Examiner*—Zoila E Cabrera

(57) ABSTRACT

An intelligent electronic device (IED) includes a base module having a power monitoring circuit operative to monitor a parameter of a portion of a power distribution system and generate an analog signal representative thereof. The base module also includes a processor coupled with the power monitoring circuit, the processor having an analog to digital converter operative to convert the analog signal to a digital signal representative thereof. The processor operates to implement a first power management functionality and generate first power management data. At least one of a display and a communications interface couple with the processor and communicate the first power management data external to the IED. A first interface couples with the processor and the communications interface. The first interface operates to receive a first external function module. The first external function module includes a second power management functionality, where the first interface further facilitates implementation of the second power management functionality.

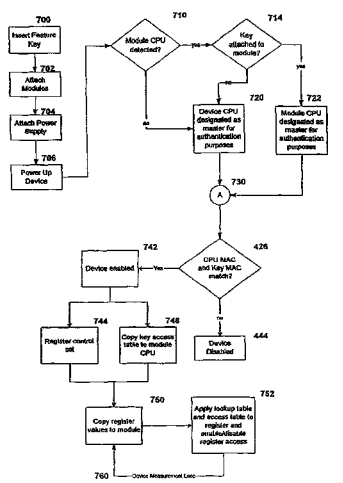

U.S. PATENT DOCUMENTS

| | | | |
|---|---|---|---|
| 5,736,847 A | 4/1998 | Van Doorn et al. | |
| 5,745,044 A | 4/1998 | Hyat et al. | |
| 5,764,155 A | 6/1998 | Kertesz | |
| 5,768,148 A | 6/1998 | Murphy et al. | |
| 5,862,391 A | 1/1999 | Salas et al. | |
| 5,933,092 A | 8/1999 | Ouellette | |
| 5,963,734 A | 10/1999 | Ackerman et al. | |
| 5,964,879 A | 10/1999 | Dunstan et al. | |
| 6,105,093 A | 8/2000 | Rosner et al. | |
| 6,124,806 A | 9/2000 | Cunningham | |
| 6,178,362 B1 | 1/2001 | Woolard et al. | |
| 6,272,552 B1 | 8/2001 | Melvin et al. | |
| 6,298,376 B1 | 10/2001 | Rosner et al. | |
| 6,301,527 B1 | 10/2001 | Butland et al. | |
| 6,321,272 B1 | 11/2001 | Swales | |
| 6,519,509 B1 | 2/2003 | Nierlich | |
| 6,535,983 B1 | 3/2003 | McCormack et al. | |
| 6,553,336 B1 | 4/2003 | Johnson et al. | |
| 6,553,418 B1 | 4/2003 | Collins et al. | |
| 6,564,332 B1 | 5/2003 | Nguyen et al. | |
| 6,587,873 B1 * | 7/2003 | Nobakht et al. | 709/219 |
| 6,587,884 B1 | 7/2003 | Papadopoulos et al. | |
| 6,618,709 B1 | 9/2003 | Sneeringer | |
| 6,640,308 B1 | 10/2003 | Keyghobad et al. | |
| 6,671,635 B1 | 12/2003 | Forth et al. | |
| 6,714,977 B1 | 3/2004 | Fowler et al. | |
| 6,762,675 B1 | 7/2004 | Cafiero et al. | |
| 6,792,337 B2 | 9/2004 | Blackett et al. | |
| 6,961,641 B1 | 11/2005 | Forth et al. | |
| 7,181,517 B1 | 2/2007 | Iavergne et al. | |
| 7,327,558 B2 | 2/2008 | Kennedy et al. | |
| 7,447,762 B2 | 11/2008 | Curray et al. | |
| 2002/0082748 A1 | 8/2001 | Enga | |
| 2003/0226050 A1 | 12/2003 | Yik et al. | |
| 2004/0024717 A1 | 2/2004 | Sneeringer | |

OTHER PUBLICATIONS

Dranetz Power Platform® PP1 & PP1E with TASKCard®–8000 Operator's Manual Revision A, Apr. 15, 1997.
Dranetz Power Platform® 4300 with TASKCard® 808 User's Guide, pp. ii–146, Jul. 1998.
Deposition of Erich W. Gunther, pp. 1–250, Nov. 14, 2008.
Dranetz Brochure, "Total Electrical System Management 8000–2", pp. 1–3.
Dranetz Power Platform® PP1 and PP1E TASKCard®–PQPLUS Operator's Manual Revision A, Apr. 15, 1997.
Dranetz Brochure, "Tomorrow's Technology Working for You Today", pp. 1–11, 1994.
BMI Brochure, "PowerProfiler™ 3030(A)", pp. 1–2, 1994.
BMI 3030/3060 Power Profiler User's Guide, pp. 1–8, 1990.
Dranetz OM–PC–PP1 PC PP1 Communication and Analysis Software Operator's Manual, pp. 1–6, Mar. 15, 1994.
Dranetz Brochure, "Power Platform® PP1–R", pp. 1–2.
DRAN–SCAN® 2000 Version 3.x, Power Quality Monitoring System Installation and Startup Guide, pp. ii–43, Nov. 1998.
Dranetz Power Platform® PP1–R User's Guide Revision A, Nov. 1998.
Dranetz Brochure, "Power Platform 4300 with TASKCard 808 Demand/Energy and Harmonic Analysis", pp. 1, 1996.
Dranetz Power Platform® Model 4300 TASKCard® PQLite Operator's Manual Revision A, Jan. 15, 1997.
Dranetz Power Platform® 4300 TASKCard® PQLite User's Guide Revision B, May 1, 2002.
7100/7100S PQNode® User's Guide, pp. iii–33, 1998.
8010 PQNode User's Guide, Revision A, pp. iii–33, 1998.
Power Measurement Ltd., 3720 ACM Advanced Power Instrumentation Package, pp. 1–12, Sep. 14, 1992.
Brochure, Model 3600A Power Line Disturbance Monitor, pp. 1–5.
Liebert Brochure, Model 3600A Portable Programmable Power Line Disturbance Monitor, pp. 1–2, 1985.
Franklin Electric Service Manual for Model 3600 Power Line Disturbance Monitor, pp. 1–28.
Brochure, "DataNodes™ EPQ Series, A Clear and Open Window to Enhanced Power Quality, Energy and More", pp. 1.
Melhom et al., "Accessing Power Quality Information and Monitoring Results Using the World Wide Web or a Private Corporate Web", pp. 1–12.
Dranetz Series 5500 InfoNode® User's Guide D, 1999.
Signature System™ Brochure, "Information. Knowledge. Power.", pp. 1–9, 1999.
Dranetz Series 5500 DualNode User's Guide Revision C, 2002.
Dranetz EPQ DataNode® Series User's Guide Revision D, 2000.
Dranetz Power Platform, PP1 SM–PP1 Service Manual, Feb. 1, 1995.
Dranetz Power Platform Platform 4300 Service Manual, Revision B, May 1, 2002.
kV S–Base Meters, pp. 1–2, Sep. 1999.
GE kV Vector Electricity Meter, Product Description, Option Board Installation Procedures, Operating Instructions, Maintenance Instructions and Cite Analysis Guides, 1997.
Manual, "kV Vector Electricity Meter with the Site Genie Monitor".
Gunther et al., "Application of Advanced Characterization Alogrigthms, UCA and Internet Communications Technology At the Point of Power Quantity and Quality Measurement", *Presented at EPRI 1999 PQA Conference, Charlotte, NC,* pp. 1–16, 1999.
Dranetz Series 5500 InfoNode User's Guide, Revision D, 2000.
Dranetz Power Evaluation Software User's Guide, Revision H, 2000.
Dranetz Brochure, "Series 626 Universal Disturbance Analyzer", pp. 1–16.
Dranetz 8800 PowerScope® User's Guide, 1992.
Manual, "TM–115000–G1 vol. 2—Service Manual Model 658 Power Quality Anazyer, Revision A," Mar. 1, 1995.
Dranetz 658 PQ Analyzer User's Guide, Revision A, Feb. 15, 1997.
Dranezt Brochure, "Power Platform 4300 Handheld Power Analysis", pp. 1–16, 1995.
"Electronic Energy Meter with Powerline Modem on DSP56F80x", Preliminary Information Application Brief, pp. 1–2, 2000.
Square D Bulletin, "Powerlogic® Series 4000 Circuit Monitor", pp. 1–6, Apr. 2000.
Square D Bulletin, "Powerlogic Ethernet Communication Card", pp. 1–2, Aug. 2000.
"Powerlogic® Advanced Power Reliability Solutions," Square D Schneider Electric, brochure, 2000, 6 pages.
"Powerlogic® Circuit Monitor—Series 2000," Class 3020, Square D Schneider Electric, brochure, 6 pages.

"Powerlogic® Power Meter," Class 3020, Square D Schneider Electric, brochure, 1998, 3 pages.

"Powerlogic® Metering and Monitoring Devices," Square D Schneider Electric, brochure, 2000, 3 pages.

"Powerlogic® Power Monitoring and Control System," Square D Schneider Electric, brochure, 1998, 8 pages.

"Powerlogic® Series 4000 Circuit Monitor," Square D Schneider Electric, brochure, 2000, 4 pages.

"Digest," Square D Schneider Electric, product catalog, Mar. 2000, 10 pages.

"Powerlogic® Series 4000 Circuit Monitor Now Available with Ethernet Communications Card," Square D Schneider Electric, News Release, Jul. 20, 2000, 2 pages.

"Powerlogic® Ethernet Communications Card," Square D Schneider Electric, Instruction Bulletin, Sep. 2000, 59 pages.

"Powerlogic® Series 4000 Circuit Monitor," Square D Schneider Electric, brochure, Apr. 2000, 6 pages.

"Powerlogic® Ethernet Communication Card," Square D Schneider Electric, brochure, Aug. 2000, 2 pages.

"Powerlogic® Ethernet Communication Card," Square D Schneider Electric, brochure, Nov. 2004, 2 pages.

"Powerlogic® Circuit Monitor Series 4000, Institution Bulletin No. 63230–300–200, Feb. 2000 Now Available with Ethernet Communication Card," Square D Schneider Electric, News Release, Jul. 20, 2000, 282 pages.

"Powerlogic® Ethernet Communication Card," Schneider Electric, Instruction Bulletin No. 63230–304–200, Sep. 2000, 70 pages.

"Powerlogic® Circuit Monitor Series 4000 Installation Manual," Schneider Electric, Instruction Bulletin No. 63230–300–209B1, Dec. 2005, 110 pages.

"Powerlogic® Circuit Monitor Series 4000 Installation Manual," Schneider Electric, Instruction Bulletin No. 63230–300–212B1, Dec. 2005, 234 pages.

"Powerlogic® Ethernet Communications Card," Schneider Electric, Instruction Bulletin No. 63230–314–202A4, Jan. 2006, 14 pages.

"Powerlogic® Ethernet Communications Card," Schneider Electric, Instruction Bulletin No. 63230–304–204A4, Jan. 2006, 46 pages.

Report of Richard Bingham dated Jun. 18, 2009 (pp. 1–56 of 71 (56 pages), and Appendix A (9 pages) (65 pages total)).

Report of Michael O. Warnecke dated May 27, 2009.

Gunther et al., "Application of Advanced Algorithms and Internet Communications Technology at the Point of Power Measurement," http://www.pqmonitoring.com/papers/ieee99sm/, IEEE Summer Meeting 1999, Jul. 20, 1999, 23 pages.

"GE kV2 Multifunction Electricity Meter," GE Industrial Systems, GEH–7277, Product Description, Operating Instructions, Maintenance Instructions, Upgrading, Site Analysis Guides, Diagrams, Dec. 2000.

"GE kV2 Multifunction Meter," GE Industrial Systems, GEH–7278, Features and Applications.

"PowerPlus Alpha® Meter," *ABB Network Partner,* brochure (May 1997) (6 pages).

QUAD4® Plus/MAXsys™ *Products User's Guide,* Chapter 1 Overview (2 pages).

"ALPHA Stars™, National Wireless Communications for Remote Metering," *ABB Information Systems,* Bulletin (24 pages).

"AIN Alpha, High Function Multi–Tariff Solid State Electricity Meter," *ABB Information Partner,* PB 42–280–1b, pp. 1–20.

"Alpha Solid State Polyphase Meter (Watts, VARs, VA)," *ABB Network Partner,* Product Bulletin, Sep. 15, 1995 (12 pages).

"POWERLOGIC® Series 4000 Circuit," Square D/Schneider Electric, Bulletin No. 3020HO0001, Apr. 2000 (6 pages).

"Web–Enabled Power Management Solutions," Square D/Schneider Electric, Product Brochure, Jan. 2002 (8 pages).

Clark, "Printed Circuit Engineering: Optimizing for Manufacturability," 1989, pp. 34–35,38–40, 163.

Judd et al., "Soldering in Electronics Assembly," $1^{st}$ Edition, 1992, pp. 1–20.

Internet Technology Aids Plant Operations, Power Engineering (Aug. 1998).

Motorola Preliminary Information Application Brief, "Electronic Energy Meter with Powerline Modem On DSP56F80x," undated, 2 pages.

Series 5500 Infonode® User's Guide; Dranetz–BMI, Revision D, 1992, 2002, 2004, pp. i–A12.

DX–9100 Extended Digital Controller by Johnson Controls, Inc. Aug. 1996.

PowerLogic Circuit Monitor Series 2000 Reference Manual by Square D. Co. Bulletin No. 3020IM9806 Feb. 1999.

New Intelligent Electronic Devices Change the Structure of Power Distributions Systems by Dr. Tevfik Sezi and Brent.K..Duncan PE 1999.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 52-69 and 70 are determined to be patentable as amended.

Claims 2-51 and 71-74, dependent on an amended claim, are determined to be patentable.

1. An IED comprising:
a base module, said base module including:
a power monitoring circuit operative to monitor a parameter of a portion of a power distribution system and generate an analog signal representative thereof;
a processor coupled with said power monitoring circuit, said processor comprising an analog to digital converter operative to convert said analog signal to a digital signal representative thereof, said processor operative to implement first power management functionality and generate first power management data;
at least one of a display and a communications interface coupled with said processor and operative to communicate said first power management data external to said IED;
a first interface coupled with said processor and said at least one of a display and a communications interface, said first interface operative to receive a first external function module *and operating power for the base module via the first external function module*, said first external function module comprising second power management functionality, wherein said first interface is further operative to facilitate implementation of said second power management functionality.

52. A method of expanding functionality of an IED, said IED comprising a base module coupled with a portion of a power distribution system, said method comprising:
  (a) monitoring a parameter of said portion;
  (b) generating an analog signal representative of said parameter;
  (c) converting said analog signal to a digital signal representative thereof;
  (d) implementing first power management functionality on said digital signal;
  (e) generating first power management data by said first power management functionality;
  (f) communicating said first power management data externally of said IED via at least one of a display and a communications interface;
  (g) receiving a first external function module by said base module *via a module interface*, said first external function module comprising second power management functionality;
  (h) *receiving operating power for the base module via the first external function module through the module interface; and*
  [(h)] (*i*) facilitating implementation of said second power management functionality.

53. The method of claim 52, wherein said first power management functionality comprises a first plurality of power management functions, said method further comprising:
  [(i)] (*j*) facilitating said second power management functionality to disable a first subset of said first plurality of power management functions.

54. The method of claim 53, wherein said second power management functionality comprises a second plurality of power management functions, said method further comprising:
  [(j)] (*k*) facilitating substitution of said second subset for said first subset.

55. The method of claim 52, wherein said first power management functionality comprises a first set of register outputs stored in a memory, said method further comprising:
  [(i)] (*j*) facilitating said second power management functionality to utilize a subset of said first set of register outputs independent of said register outputs' location in said memory.

56. The method of claim 52, further comprising:
  [(i)] (*j*) communicating said digital signal to said first external function module.

57. The method of claim 56, wherein [(i)] (*j*) further comprises communicating said digital signal in real time.

58. The method of claim 57, wherein [(i)] (*j*) further comprises communicating samples representative of at least one of voltage and current continuously in real time.

59. The method of claim 56, further comprising:
  [(j)] (*k*) computing a kilowatt value by said second power management functionality based on said digital signal.

60. The method of claim 56, further comprising:
  [(j)] (*k*) computing at least one harmonic by said second power management functionality based on said digital signal.

61. The method of claim 56, further comprising:
  [(j)] (*k*) recording a waveform by said second power management functionality based on said digital signal.

62. The method of claim 56, further comprising:
  [(j)] (*k*) computing at least one symmetrical component by said second power management functionality based on said digital signal.

63. The method of claim 52, further comprising:
  [(i)] (*j*) receiving, by said base module, said first external function module without uninstalling said IED.

64. The method of claim 52, further comprising:
  [(i)] (*j*) communicating with a second external function module coupled with said first external function module through said first external function module.

65. The method of claim 64, further comprising:
  [(j)] (*k*) identifying each of said first and second external function modules for subsequent individual communications with said base module based on a first connection of said second external function module to said first external function module and a second connection of said first external function module to said base module.

66. The method of claim 52, further comprising:
  [(i)] (*j*) storing first program code in a first non-volatile memory in said base module;

[(j)] (k) accessing a second non-volatile memory in said first external function module, said second non-volatile memory comprising second program code; and

[(k)] (l) replacing said first program code in said first non-volatile memory with said second program code.

67. The method of claim 66, further comprising:

[(l)] (m) checking a version identifier of said second program code; and wherein (k) further if identifies said second program code as a later version than said first program code.

68. The method of claim 66, further comprising:

[(l)] (m) selecting said second program code from a plurality of program code stored in said second non-volative memory based on compatibility with said base module.

69. The method of claim 66, further comprising:

[(l)] (m) selecting a correct version of said second program code from a plurality of program code stored in said second non-volatile memory, each of said plurality of program code characterized by a different version.

70. An IED comprising:

a power monitoring circuit operative to monitor a parameter of a portion of a power distribution system and generate an analog signal representative thereof;

an analog to digital converter coupled with said power monitoring circuit, said analog to digital converter operative to convert said analog signal to a digital signal representative thereof;

a processor coupled with said analog to digital converter and operative to implement first power management functionality and generate power management data;

at least one of a display and a communications interface coupled with said processor and operative to communicate said power management data external to said IED;

an interface coupled with said processor and operative to receive a power supply; and wherein said power supply supplies power to the IED and said power supply can be removed without uninstalling said IED; and said interface further operative to receive[.] said *power via* a first external function module comprising second power management functionality.

* * * * *